(12) United States Patent
Ogasawara et al.

(10) Patent No.: US 8,725,695 B2
(45) Date of Patent: May 13, 2014

(54) STORAGE SYSTEM AND OBJECT MANAGEMENT METHOD

(75) Inventors: Hiroshi Ogasawara, Odawara (JP); Hitoshi Arai, Chigasaki (JP); Homare Kanie, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 101 days.

(21) Appl. No.: 13/384,019

(22) PCT Filed: Oct. 28, 2011

(86) PCT No.: PCT/JP2011/074970
§ 371 (c)(1),
(2), (4) Date: Jan. 13, 2012

(87) PCT Pub. No.: WO2011/074970
PCT Pub. Date: Jun. 23, 2011

(65) Prior Publication Data
US 2013/0110891 A1    May 2, 2013

(51) Int. Cl.
*G06F 17/30* (2006.01)

(52) U.S. Cl.
USPC .......... 707/644; 707/634; 707/654; 707/655; 707/674; 714/4.3; 714/6; 714/15; 711/162

(58) Field of Classification Search
USPC .......... 707/634, 644, 654, 655, 674; 711/162; 714/4.3, 6, 15
See application file for complete search history.

(56) References Cited

U.S. PATENT DOCUMENTS

| | | | |
|---|---|---|---|
| 7,657,796 B1 * | 2/2010 | Kaiser et al. | 714/54 |
| 7,882,393 B2 * | 2/2011 | Grimes et al. | 714/25 |
| 8,015,430 B1 * | 9/2011 | Rakic et al. | 714/2 |
| 8,315,973 B1 * | 11/2012 | Kaiser et al. | 707/609 |
| 2004/0093361 A1 * | 5/2004 | Therrien et al. | 707/204 |
| 2007/0186068 A1 * | 8/2007 | Agrawal | 711/162 |
| 2007/0226438 A1 * | 9/2007 | Erofeev | 711/162 |
| 2008/0010485 A1 * | 1/2008 | Shitomi et al. | 714/3 |
| 2009/0049263 A1 * | 2/2009 | Hara et al. | 711/162 |

(Continued)

FOREIGN PATENT DOCUMENTS

| | | |
|---|---|---|
| JP | 2005-538469 | 12/2005 |
| JP | 2009-289252 | 12/2009 |
| JP | 2011-039805 | 2/2011 |

OTHER PUBLICATIONS

PCT International Search Report and Written Opinion on application No. PCT/JP2011/074970 dated Nov. 29, 2011; 10 pages.

*Primary Examiner* — Dennis Truong
(74) *Attorney, Agent, or Firm* — Foley & Lardner LLP

(57) ABSTRACT

A storage system comprises a second NAS storage apparatus comprising a processor and a storage medium and a third NAS storage apparatus for migrating an object managed by a first NAS storage apparatus. The processor stores path information of an object for which migration has started after including the path information in object management information, in the storage medium prior to migrating the object entity to the third NAS storage apparatus. The processor, after receiving the object entity from the first NAS storage apparatus and migrating the object entity to the third NAS storage apparatus, stores the third NAS storage apparatus path information to the object entity in the object management information, and reflects the management information in the third NAS storage apparatus.

11 Claims, 24 Drawing Sheets

(56) References Cited

U.S. PATENT DOCUMENTS

| | | | |
|---|---|---|---|
| 2009/0177720 A1* | 7/2009 | Shitomi et al. | 707/204 |
| 2009/0300079 A1* | 12/2009 | Shitomi | 707/204 |
| 2010/0100529 A1* | 4/2010 | Erofeev | 707/610 |
| 2010/0153740 A1* | 6/2010 | Dodgson | 713/189 |
| 2010/0274825 A1* | 10/2010 | Nemoto et al. | 707/812 |
| 2011/0040729 A1* | 2/2011 | Ito et al. | 707/654 |
| 2011/0072229 A1* | 3/2011 | Hara et al. | 711/162 |
| 2012/0297246 A1* | 11/2012 | Liu et al. | 714/15 |

\* cited by examiner

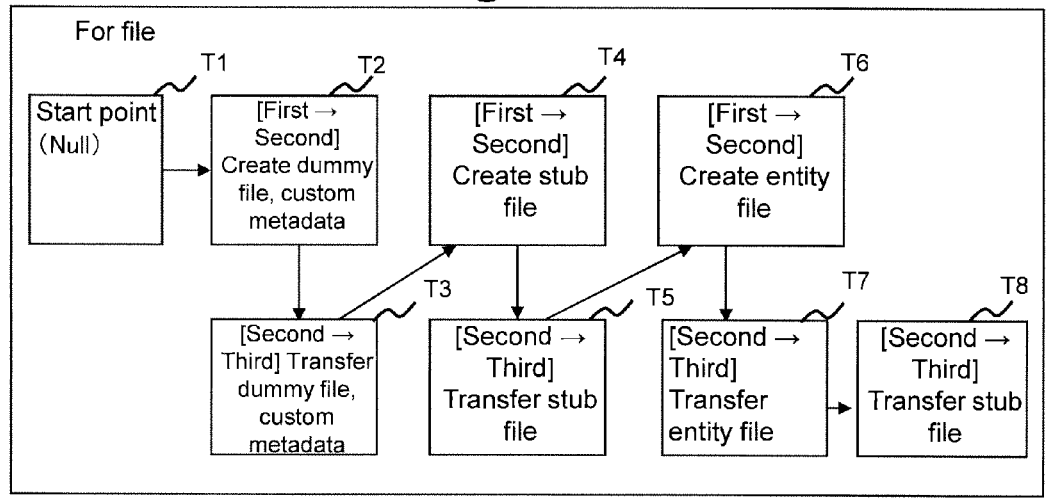
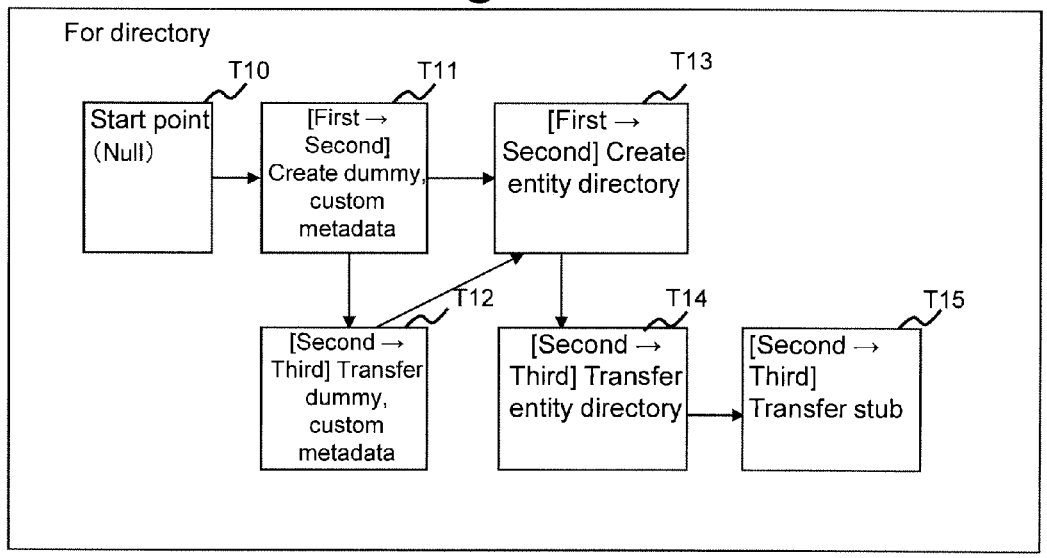

Fig.3A inode structure (for directory) 400

| # | Content |
|---|---|
| 1 | inode number |
| 2 | Object mode (denotes target is directory) |
| ... | (omitted) * various types of metadata (creation time, etc.) |
| 3 | Pointer to object entity (dentry list) (physical address on disk) |
| 4 | Pointer to extended attribute data (physical address on disk) |
| 5 | Pointer to custom metadata (physical address on disk) |
| ... | (omitted) | dentry list 410

| # | Directory name/filename | inode number | uuid |
|---|---|---|---|
| 1 | Directory name/filename | inode number of subordinate file/directory | Third storage location information |
| ... | (omitted) | | |

| # | Directory name/filename | inode number | uuid |
|---|---|---|---|
| 1 | file1 | 30 | uuid1 |
| 2 | dir1 | 40 | uuid2 |
| 3 | dir2 | 45 | uuid3 |
| 4 | file2 | 55 | uuid4 |
| 5 | file3 | 60 | uuid5 |
| ... | (omitted) | | |

Fig. 5

| # | Storage information | Explanation of storage information |
|---|---|---|
| 1 | First NAS storage system path information | Storage path of object in first NAS storage system (Ex: /dir1/dir11/file1) |
| 2 | Dummy object determination flag | Flag denoting object type (whether dummy object or not) Ex: Dummy object = Yes |
| ... | (omitted) | Required information for normal file, such as size, creation date/time, access date/time, and access permission of relevant file, file storage period information, modification advisability information, etc. |

Fig. 6 inode structure (dummy state (dummy object))     400

| # | Content |
|---|---|
| 1 | inode number |
| 2 | Object mode (denotes file or directory) |
| ... | (omitted) * various types of metadata (creation time, etc.) |
| 3 | Pointer to object entity: none |
| 4 | Pointer to extended attribute data: none |
| 5 | Pointer to custom metadata: none |
| ... | (omitted) |

Fig. 7 inode structure (stubification state)　　400

| # | Content |
|---|---|
| 1 | inode number |
| 2 | Object mode |
| ... | (omitted) * various types of metadata (creation time, etc.) |
| 3 | Pointer to entity: none |
| 4 | Pointer to extended attribute data |
| 5 | Pointer to custom metadata |
| ... | (omitted) |

420

| # | Storage information | Example of storage information |
|---|---|---|
| 1 | Namespace | None |
| 2 | Third NAS storage system path information | None |
| 3 | Second NAS storage system path information | None |
| 4 | First NAS storage system path information | /dir1/dir11/file1 |
| 5 | Stub bit | 0 (stubified = No) |
| 6 | Object change bit | 0 (Object changed = No) |
| 7 | Data sent bit | 0 (Data sent = No) |

Fig.9

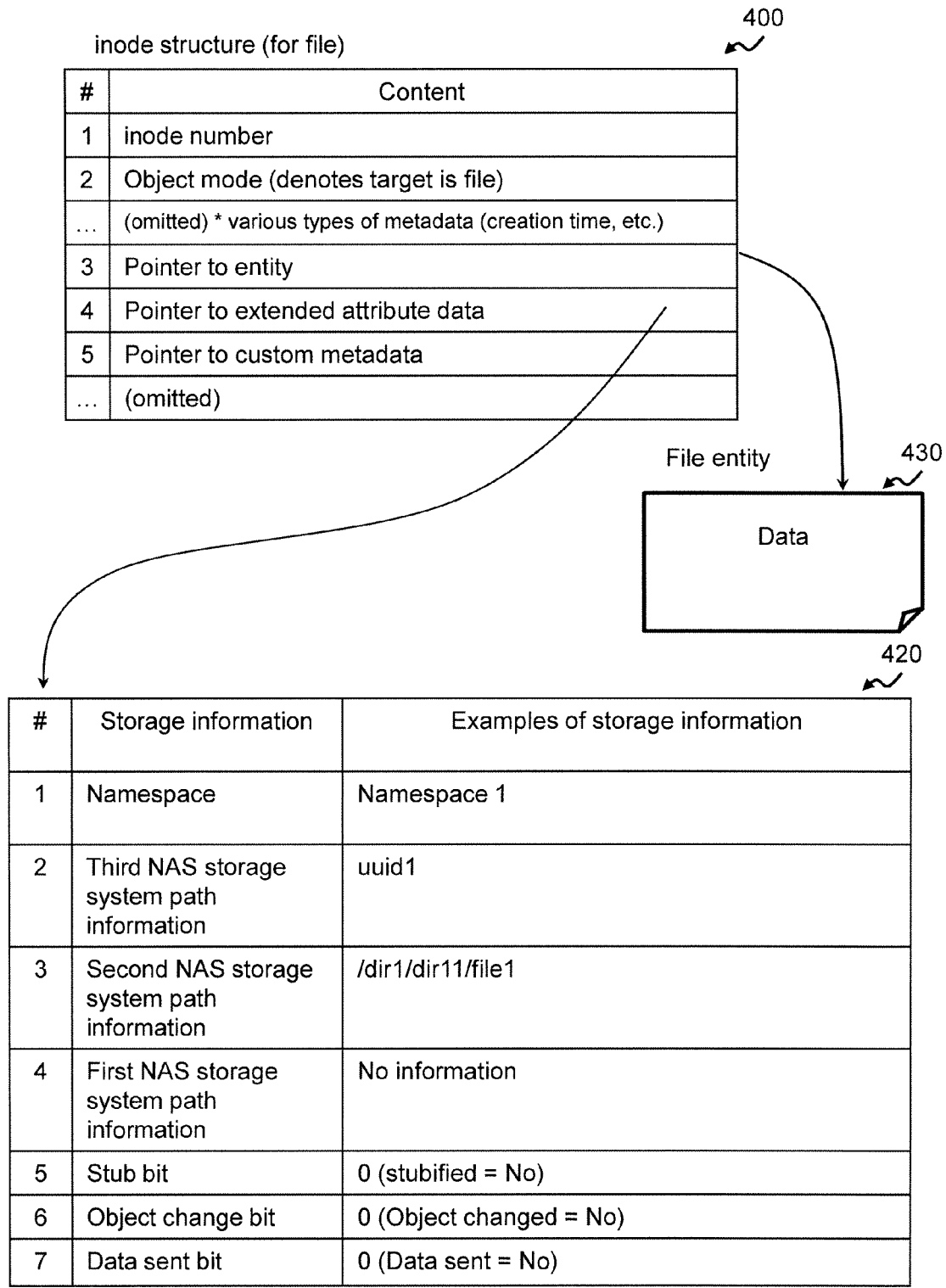

inode structure (for file) 400

| # | Content |
|---|---|
| 1 | inode number |
| 2 | Object mode (denotes target is file) |
| ... | (omitted) * various types of metadata (creation time, etc.) |
| 3 | Pointer to entity |
| 4 | Pointer to extended attribute data |
| 5 | Pointer to custom metadata |
| ... | (omitted) |

File entity 430

Data

420

| # | Storage information | Examples of storage information |
|---|---|---|
| 1 | Namespace | Namespace 1 |
| 2 | Third NAS storage system path information | uuid1 |
| 3 | Second NAS storage system path information | /dir1/dir11/file1 |
| 4 | First NAS storage system path information | No information |
| 5 | Stub bit | 0 (stubified = No) |
| 6 | Object change bit | 0 (Object changed = No) |
| 7 | Data sent bit | 0 (Data sent = No) |

STORAGE SYSTEM AND OBJECT MANAGEMENT METHOD

TECHNICAL FIELD

The present invention relates to a storage system comprising, for example, a second NAS (Network Attached Storage) storage apparatus and a third NAS storage apparatus, which serve as the migration destinations of an object (a file or directory) which is managed by a first NAS storage apparatus.

BACKGROUND ART

Conventionally, an object, such as a file or directory, which is being managed by a NAS storage apparatus, is migrated to another NAS storage apparatus.

For example, Patent Literature 1 discloses the migration of a relevant object from a NAS apparatus (A) to a NAS apparatus (B) triggered by the passage of a fixed period of time from the latest update. The Patent Literature 1 also discloses that the migrated file is stored as a file in a file system on the NAS apparatus (B), and the relevant file in the NAS apparatus (A) is replaced with a stub in which information pointing to the migration-destination file is recorded.

CITATION LIST

Patent Literature

[PTL 1]
Japanese Patent Application Laid-open No. 2011-039805

SUMMARY OF INVENTION

Technical Problem

For example, a file, which is being managed in a first NAS storage apparatus, may be migrated to a storage system comprising a second NAS storage apparatus, and a third NAS storage apparatus for use as an archive with respect to the second NAS storage apparatus.

In so doing, when migrating a file from the first NAS storage apparatus to the second NAS storage apparatus, the file is migrated from the second NAS storage apparatus to the third NAS storage apparatus, and in the second NAS storage apparatus, the file is created as a stub pointing to the file of the third NAS storage apparatus.

The problem, for example, is that in a case where a failure occurs in the second NAS storage apparatus during this processing, the migration of the file from the first NAS storage apparatus must be started over again after replacing a storage medium in the second NAS storage apparatus, requiring a long time for restore processing.

With the foregoing problem in view, an object of the present invention is to provide technology for making it possible to execute restore processing quickly in a case where a failure has occurred during the migration of data from a NAS storage apparatus.

Solution to Problem

A storage system related to an aspect of the present invention comprises a second NAS (Network Attached Storage) storage apparatus and a third NAS storage apparatus for migrating an object, which is being managed by a first NAS storage apparatus. The second NAS storage apparatus comprises a processor and a storage medium capable of storing data. With respect to an object for which a migration from the first NAS storage apparatus has begun, the processor of the second NAS storage apparatus includes the object path information, which is in the first NAS storage apparatus, in object management information, and stores this information in a storage medium prior to migrating the entity of the object to the third NAS storage apparatus. The processor also receives the object entity from the first NAS storage apparatus, and after migrating this object entity to the third NAS storage apparatus, stores the path information to the object entity in the third NAS storage apparatus in the object management information, and reflects the management information in the third NAS storage apparatus.

BRIEF DESCRIPTION OF DRAWINGS

FIG. 1 is a diagram showing an overview of the processing of a storage system related to an embodiment of the present invention; FIG. 1A is a diagram showing an overview of the processing when a file is migrated in the storage system related to the embodiment of the present invention; and FIG. 1B is a diagram showing an overview of the processing when a directory is migrated in the storage system related to the embodiment of the present invention.

FIG. 3 is a diagram illustrating a first example of an object management structure related to the embodiment of the present invention; FIG. 3A is a diagram illustrating the object management structure related to the embodiment of the present invention; and FIG. 3B is a diagram showing a specific example of the object management structure related to the embodiment of the present invention.

FIG. 5 is a diagram illustrating an example of custom metadata related to the embodiment of the present invention.

FIG. 6 is a diagram showing an example of a dummy-state object management structure related to the embodiment of the present invention.

FIG. 7 is a diagram showing an example of a stub-state object management structure related to the embodiment of the present invention.

FIG. 9 is a diagram showing a second example of an entity-state object management structure related to the embodiment of the present invention.

DESCRIPTION OF THE EMBODIMENT

Figure 2:
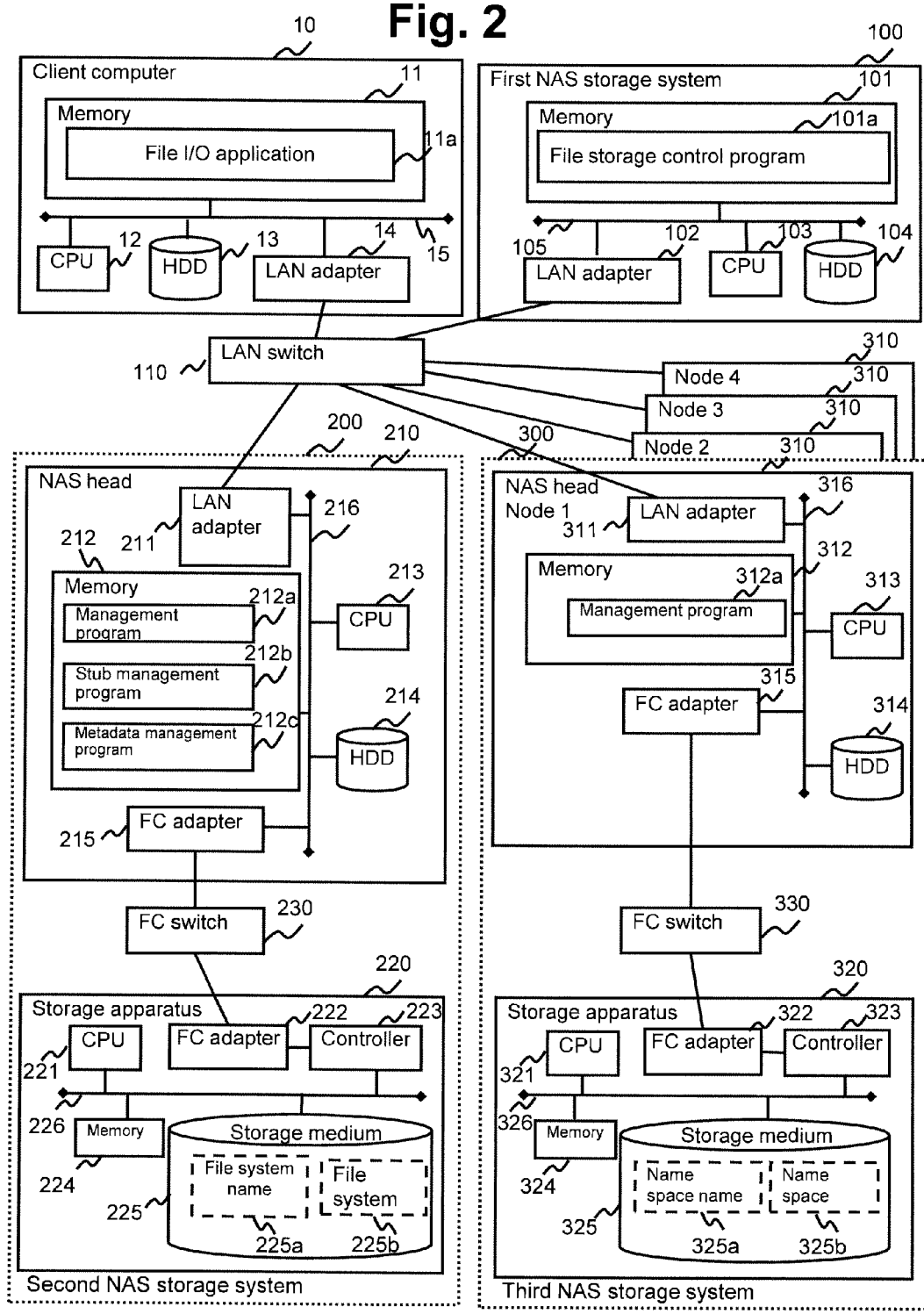
FIG. 2 is a block diagram of the storage system related to the embodiment of the present invention.

An embodiment of the present invention will be explained by referring to the drawings. Furthermore, the embodiment, which is explained hereinbelow, does not limit the invention of the claims, and not all of the components and combinations thereof described in the embodiment are essential as the solution of the invention.

Furthermore, in the following explanation, there may be cases where processing is explained having a "program" as the doer of the action, but since the stipulated processing is performed in accordance with a program being executed by a processor (for example, a CPU (Central Processing Unit)) while using a storage resource (for example, a memory) and/or a communication interface device (for example, a LAN adapter or a FC adapter) as needed, the processor may also be used as the doer of the processing. A process, which is explained having the program as the doer of the action, may be regarded as a process performed by the processor or a system comprising this processor (for example, a NAS storage apparatus). The present invention may comprise a hardware circuit, which performs either all or part of the processing performed by the processor. A program may be installed from a program source. The program source, for example, may be either a program delivery server or a storage medium.

First of all, an overview of a storage system of the embodiment of the present invention will be explained.

The storage system, as shown in FIG. 2, comprises a first NAS storage apparatus 100, a second NAS storage apparatus 200, and a third NAS storage apparatus 300. In the storage system, an object, such as a file or a directory, which is stored in the first NAS storage apparatus 100, is migrated to the second NAS storage apparatus 200 and the third NAS storage apparatus 300. That is, the first NAS storage apparatus 100 is the file migration-source storage apparatus, and the second NAS storage apparatus 200 and the third NAS storage apparatus 300 constitute the file migration-destination storage apparatuses.

The process for migrating an object from the first NAS storage apparatus 100 will be explained here by dividing this process into a file migration process and a directory migration process.

FIG. 1 is a diagram showing an overview of the processing of a storage system related to the embodiment of the present invention. FIG. 1A is a diagram of an overview of the processing when a file is migrated focused on the second NAS storage apparatus 200. FIG. 1B is a diagram of an overview of the processing when a directory is migrated focused on the second NAS storage apparatus 200.

At a start point, where a file migration begins, there is no file or the like stored in the second NAS storage apparatus 200 as shown in FIG. 1A (time T1). When a file migration starts, the second NAS storage apparatus 200 creates dummy-state file management information (a dummy file: refer to FIG. 6) and custom metadata (refer to FIG. 5) comprising the path information of the file in the first NAS storage apparatus 100 based on file management information in the first NAS storage apparatus 100 (time T2).

The second NAS storage apparatus 200 stores the dummy file and the custom metadata in the third NAS storage apparatus 300 (time T3). Even in a case where a failure occurs in the second NAS storage apparatus 200 at this point, the file can be identified in the first NAS storage apparatus 100 and used in a restore by utilizing the custom metadata path information stored in the third NAS storage apparatus 300.

Next, the second NAS storage apparatus 200 stubifies the management information to create a stub file (refer to FIG. 7) by adding extended attribute data, which includes the path information of the first NAS storage apparatus and a pointer to the extended attribute data to the dummy file based on the management information of the first NAS storage apparatus 100 file (time T4). The second NAS storage apparatus 200 stores the stub file in the third NAS storage apparatus 300 (time T5).

Next, the second NAS storage apparatus 200 acquires the entity of the corresponding file (file entity) from the first NAS storage apparatus 100, and substantializes the file to create an entity file (the file entity and management information: refer to FIG. 8) (time T6). Furthermore, the newly created file in the second NAS storage apparatus 200 transitions to the same state as at time T6 subsequent to creation.

Next, the second NAS storage apparatus 200 stores the entity file in the third NAS storage apparatus 300 (time T7). Thereafter, the second NAS storage apparatus 200 deletes the corresponding file entity from its own storage medium, stores the third NAS storage apparatus path information of the file entity in the management information, to create a stub file (refer to FIG. 9), and stores the stub file in the third NAS storage apparatus 300 (time T8). Even in a case where a failure occurs in the second NAS storage apparatus 200 here, the file can be identified in the third NAS storage apparatus 300 and used in a restore by utilizing the stub file path information stored in the third NAS storage apparatus 300.

Alternatively, at the start point, where a directory migration begins, there is no directory stored in the second NAS storage apparatus 200 as shown in FIG. 1B (time T10). When a directory migration starts, the second NAS storage apparatus 200 creates dummy-state management information for a directory (a dummy directory: refer to FIG. 6) and custom metadata (refer to FIG. 5) comprising the path information of the directory in the first NAS storage apparatus based on directory management information in the first NAS storage apparatus 100 (time T11).

The second NAS storage apparatus 200 stores the dummy directory and the custom metadata in the third NAS storage apparatus 300 (time T12). At this point, even in a case where a failure occurs in the second NAS storage apparatus 200, the directory can be identified in the first NAS storage apparatus 100 and used in a restore by utilizing the custom metadata path information stored in the third NAS storage apparatus 300.

Next, the second NAS storage apparatus 200 acquires the entity of the corresponding directory (directory entity: dentry list) from the first NAS storage apparatus 100, and substantializes the directory to create an entity directory (the directory entity and management information: refer to FIG. 3)

(time T13). Furthermore, the newly created directory in the second NAS storage apparatus 200 transitions to the same state as at time T13 subsequent to creation.

Next, the second NAS storage apparatus 200 stores the entity directory in the third NAS storage apparatus 300 (time T14). Thereafter, the second NAS storage apparatus 200 deletes the corresponding directory entity from its own storage medium, stores the third NAS storage apparatus path information of the directory entity in the management information, to create a stub directory, and stores the stub directory in the third NAS storage apparatus 300 (time l15). Even in a case where a failure occurs in the second NAS storage apparatus 200 here, the directory can be identified in the third NAS storage apparatus 300 and used in a restore by utilizing the stub directory path information stored in the third NAS storage apparatus 300.

Next, the storage system related to one embodiment of the present invention will be explained in detail.

FIG. 2 is a block diagram of the storage system related to one embodiment of the present invention.

The storage system comprises a client computer (client) 10, a first NAS storage apparatus 100, a second NAS storage apparatus 200, and a third NAS storage apparatus 300. The client 10, the first NAS storage apparatus 100, the second NAS storage apparatus 200, and the third NAS storage apparatus 300 are mutually coupled by way of a LAN (Local Area Network) switch 110.

The client 10 comprises a memory 11, a CPU 12, a HDD 13, and a LAN adapter 14. The memory 11, the CPU 12, the HDD 13, and the LAN adapter 14 are coupled via a system bus 15.

The memory 11 stores a program, which is executed by the CPU 12, and data, which is used by the CPU 12. In this embodiment, the memory 11 stores a file I/O application 11a. The file I/O application 11a receives an I/O instruction with respect to a file, a newly created file, a file or directory name change, a restore instruction, and a file or directory migration instruction from a user, and comprises a function for communicating with the corresponding apparatus. The CPU 12 performs various types of processing by executing the program stored in the memory 11. The HDD 13 stores various types of information. The LAN adapter 14 relays communications with another apparatus via the LAN switch 110.

The first NAS storage apparatus 100, for example, is a well-known NAS storage apparatus, and comprises a memory 101, a LAN adapter 102, a CPU 103, and a HDD 104. The memory 101, the LAN adapter 102, the CPU 103, and the HDD 104 are coupled via a system bus 105.

The memory 101 stores a program, which is executed by the CPU 103, and data, which is used by the CPU 103. In this embodiment, the memory 101 stores a file storage control program 101a. The file storage control program 101a is a well-known program for managing a file system, and comprises functions for I/O processing with respect to a file, and processing for sending file and directory management information. The CPU 103 performs various types of processing by executing the program stored in the memory 101. The HDD 104 stores the file and directory information (management information, entity). Furthermore, the file and directory management information, for example, may comprise a well-known inode structure. The LAN adapter 102 relays communications with another apparatus via the LAN switch 110.

The second NAS storage system 200 comprises a NAS head 210 and a storage apparatus 220. The NAS head 210 and the storage apparatus 220 are communicably coupled via a FC (Fibre Channel) switch 230.

The NAS head 210 comprises a LAN adapter 211, a memory 212, a CPU 213, a HDD 214, and a FC adapter 215. The LAN adapter 211, the memory 212, the CPU 213, the HDD 214, and the FC adapter 215 are coupled via a system bus 216. The LAN adapter 211 relays communications with another apparatus via the LAN switch 110. The memory 212 stores programs, which are executed by the CPU 213, and data, which is used by the CPU 213. In this embodiment, the memory 212 stores a management program 212a, a stub management program 212b, and a metadata management program 212c. The management program 212a is for executing a process involved in the management of a file and directory, and a process for sending and receiving file and directory data. The stub management program 212b is for executing a process for stubifying a dummy object (a dummy file or a dummy object), a process for updating a stub object, and a process for sending a stub object to another apparatus (for example, the third NAS storage apparatus). The metadata management program 212c is for executing processes for creating and updating metadata (for example, an inode number, an object mode, and so forth) in object management information (an inode structure and the like).

The CPU 213 executes various types of processing in accordance with the programs stored in the memory 212. The HDD 214 stores various type of information. The FC adapter 215 relays communications with another apparatus (storage apparatus 220) via a FC switch 230.

The storage apparatus 220 comprises a CPU 221, a FC adapter 222, a controller 223, a memory 224, and a storage medium 225. The CPU 221, the controller 223, the memory 224, and the storage medium 225 are communicably coupled by way of a system bus 226.

The FC adapter 222 relays communications with another apparatus (the NAS head 210) via the FC switch 230. The memory 224 temporarily caches data to be written to the storage medium 225, and data read from the storage medium 225. The memory 224 also stores a program(s), which is/are executed by the CPU 221, and data, which is used by the CPU 221. The controller 223 controls the writing of data to the storage medium 225 and the reading of data from the storage medium 225. The CPU 221 executes various types of processing in accordance with the program(s) stored in the memory 224. The storage medium 225 stores a file system name 225a and a file system 225b. An object entity (a file or a directory) and management information for managing an object are stored in the file system 225b. The storage medium 225 may comprise one or more storage media, and the storage medium may be any of a SSD (Solid State Drive) device, a HDD device (SAS: Serial Attached SCSI), or a HDD device (SATA: Serial ATA).

The third NAS storage system 300 comprises a NAS head 310 and a storage apparatus 320. The NAS head 310 and the storage apparatus 320 are communicably coupled by way of a FC switch 330.

The NAS head 310 comprises a LAN adapter 311, a memory 312, a CPU 313, a HDD 314, and a FC adapter 315. The LAN adapter 311, the memory 312, the CPU 313, the HDD 314, and the FC adapter 315 are coupled by way of a system bus 316. The LAN adapter 311 relays communications with another apparatus via the LAN switch 110. The memory 312 stores a program, which is executed by the CPU 313, and data, which is used by the CPU 313. In this embodiment, the memory 312 stores a management program 312a. The management program 312a is for executing a process involved in the management of a file or directory, and a process for sending/receiving data to/from a file or directory.

The CPU 313 executes various types of processing in accordance with the program stored in the memory 312. The HDD 314 stores various type of information. The FC adapter 315 relays communications with another apparatus (storage apparatus 320) via the FC switch 330.

The storage apparatus 320 comprises a CPU 321, a FC adapter 322, a controller 323, a memory 324, and a storage medium 325. The CPU 321, the controller 323, the memory 324, and the storage medium 325 are communicably coupled by way of a system bus 326.

The FC adapter 322 relays communications with another apparatus (NAS head 310) via the FC switch 330. The memory 324 temporarily caches data to be written to the storage medium 325, and data read from the storage medium 325. The memory 324 also stores a program(s), which is/are executed by the CPU 321, and data, which is used by the CPU 321. The controller 323 controls the writing of data to the storage medium 325, and the reading of data from the storage medium 325. The CPU 321 executes various types of processing in accordance with the program(s) stored in the memory 324. The storage medium 325 stores a namespace name 325a, which is the name of a namespace (storage area) corresponding to one file system in the second NAS storage apparatus 200, and a namespace 325b. An object entity (file or directory), which has been sent from the second NAS storage apparatus 200, management information for managing an object, and custom metadata, which will be described further below, are stored in the namespace 325b. The storage medium 325 may comprise one or more storage media. The storage medium may be any of a SSD (Solid State Drive) device, a HDD device (SAS: Serial Attached SCSI), or a HDD device (SATA: Serial ATA). Furthermore, in this embodiment, the storage capacity of the storage medium 325 is larger than the storage capacity of the storage medium 225 of the second NAS storage apparatus 200.

FIG. 3 is a diagram illustrating a first example of an object management structure related to the embodiment of the present invention. FIG. 3A is a diagram illustrating the object management structure related to the embodiment of the present invention. FIG. 3B is a diagram showing a specific example of the object management structure related to the embodiment of the present invention. FIG. 3A and FIG. 3B denote the management structure in a case where the object is a directory.

The directory management structure comprises an inode structure 400, a dentry list 410, extended attribute data 420 (refer to FIG. 4), and custom metadata 440 (refer to FIG. 5). Here, the dentry list 410 is an entity of the directory (a directory entity), and the inode structure 400, extended attribute data 420, and custom metadata 440 are directory management information. The dentry list 410, the extended attribute data 420, and the custom metadata 440 may not exist depending on the state of the directory.

The inode structure 400 stores an inode number, an object mode, various types of metadata, a pointer to the object entity, a pointer to the extended attribute data, and a pointer to the custom metadata.

An inode number denoting a corresponding object is stored in the inode number. Here, the inode number of the top directory (the root directory) in the file system, for example, is "1". The type of an object corresponding to the relevant inode structure 400 is stored in the object mode. In this drawing, since the inode structure denotes a directory, information denoting the fact that it is a directory is stored. The data and time at which an object was created is stored in each type of metadata. A pointer to the object entity, in the case of a directory, to the dentry list 410, is stored in the pointer to the object entity. For example, a physical address on the storage medium serves as the pointer. Furthermore, in the case of a state in which the entity of the object does not exist, for example, a state in which the object is a dummy, nothing is configured in the pointer to the object entity.

A pointer to the corresponding extended attribute data is stored in the pointer to the extended attribute data. For example, a physical address on the storage medium serves as the pointer. Furthermore, in the case of a state in which the extended attribute data does not exist in the directory, for example, the case of a dummy state, nothing is configured in the pointer to the extended attribute data. A pointer to the corresponding custom metadata 440 is stored in the pointer to the custom metadata. For example, a physical address on the storage medium serves as the pointer. Furthermore, in the case of a state in which custom metadata corresponding to an object does not exist, nothing is configured in the pointer to the custom metadata.

The dentry list 410, which is an object entity, correspondingly stores an object name (directory name/filename), an inode number, and a uuid. The object name stores the name of an object, which belongs under the directory. The inode number stores the mode number of the corresponding object. The uuid stores location information (uuid) of the third NAS storage apparatus in which the corresponding object (management structure) is stored. The third NAS storage apparatus 300 is able to identify the storage location of information in the corresponding management structure in the namespace 325b of the storage medium 325 based on this uuid and the type of information (types such as inode structure, object entity, extended attribute data, and custom metadata) in the management structure of the object. Therefore, the third NAS storage apparatus 300 (specifically, the CPU 313), upon receiving a specification with the uuid and the type of information, can execute processing (a read from the storage medium 325, an update) with respect to the corresponding information.

Various information is stored in the dentry list 410, for example, as shown in FIG. 3B. According to the topmost entry of the dentry list 410 shown in FIG. 3B, it is clear that "file1" is the object, which belongs directly under the directory, that the inode number of this object is "30", and that the object is stored in a location in the third NAS storage apparatus 300 denoted as "uuid1". The other entries are also objects, which belong directly under the directory.

Figure 4:
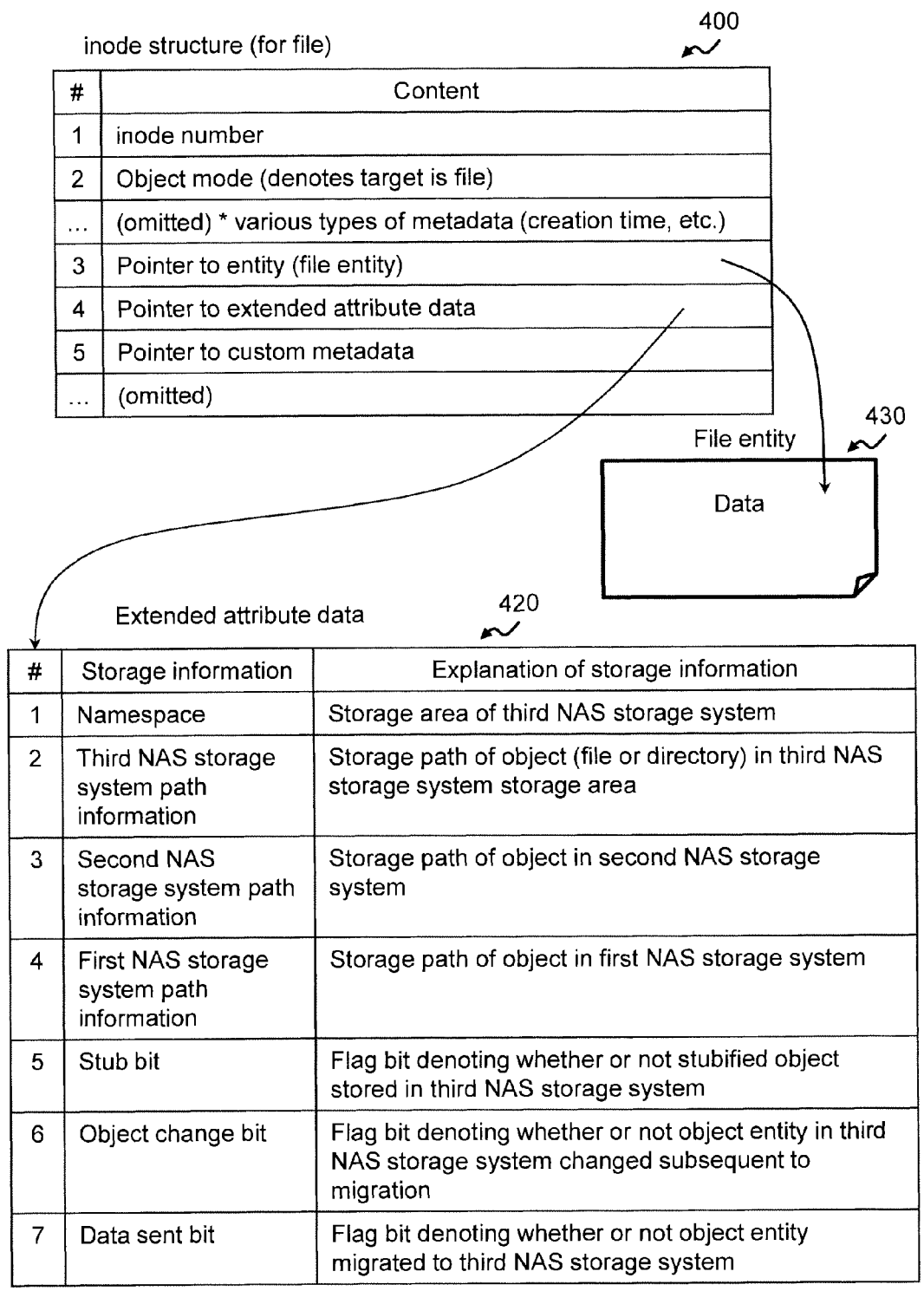
FIG. 4 is a diagram illustrating a second example of an object management structure related to the embodiment of the present invention.

FIG. 4 is a diagram illustrating a second example of an object management structure related to the embodiment of the present invention. FIG. 4 shows the object structure in a case where the object is a file.

The file management structure comprises an inode structure 400, extended attribute data 420, custom metadata 440 (refer to FIG. 5), and file entity data (file entity) 430. Here, the inode structure 400, the extended attribute data 420, and the custom metadata 440 are file management information. The extended attribute data 420, the file entity 430, and the custom metadata 440 may not exist depending on the state of the file.

The inode structure 400 of the file is structurally the same as the inode structure of the directory shown in FIG. 3A, but the stored content differs. Only the points of difference will be described here. Since the inode structure denotes a file, information denoting the fact that it is a file is stored in the object mode. A pointer to the file entity 430 is stored in the pointer to the object entity. Furthermore, nothing is configured in the pointer to the object entity in the case of a state in which the file entity does not exist, for example, a state in which the object is a dummy.

The extended attribute data 420 stores a namespace, third NAS storage apparatus path information, second NAS storage apparatus path information, first NAS storage apparatus path information, a stub bit, an object change bit, and a data sent bit.

The namespace is the name of a namespace, which is a storage area of the third NAS storage apparatus 300. The third NAS storage apparatus path information is the object storage path in the storage area of the third NAS storage apparatus 300. The second NAS storage apparatus path information is the object storage path on the second NAS storage apparatus 200. The first NAS storage apparatus path information is the object storage path on the first NAS storage apparatus 100. The stub bit is a flag bit denoting whether or not a stubified object is stored in the third NAS storage apparatus 300. The object change bit is a flag bit denoting whether or not an object entity changed subsequent to the object entity being migrated to the third NAS storage apparatus 300. The data sent bit is a flag bit denoting whether or not a file entity has been migrated to the third NAS storage apparatus 300.

FIG. 5 is a diagram illustrating an example of custom metadata related to the embodiment of the present invention.

The custom metadata 440 stores first NAS storage apparatus path information and a dummy object determination flag. The first NAS storage apparatus path information is the storage path of the corresponding object inside the NAS storage system 100. The dummy object determination flag is a flag denoting whether or not the corresponding object is a dummy object. In the case of a dummy object, a dummy object flag transitions to "1" (ON).

FIG. 6 is a diagram showing an example of a dummy-state object management structure related to the embodiment of the present invention.

The dummy-state object may be called the dummy object here, may be called a dummy file in a case where the object is a file, and may be called a dummy directory in a case where the object is a directory. The dummy object management structure includes the inode structure 400, but does not include the extended attribute data 420, and the object entity (file entity 430 or dentry list 410). An inode number and object mode are configured in the inode structure 400, but the pointer to the object entity and the pointer to the extended attribute data are not configured.

FIG. 7 is a diagram showing an example of a stub-state object management configuration related to the embodiment of the present invention.

The stub-state object may be called the stub object here, may be called a stub file in a case where the object is a file, and may be called a stub directory in a case where the object is a directory. The stub object management structure includes the mode structure 400 and the extended attribute data 420, but does not include the object entity (file entity 430 or dentry list 410). An inode number, object mode, and pointer to the extended attribute data are configured in the inode structure 400, but the pointer to the object entity is not configured. Furthermore, an object entity storage path, which corresponds to at least any one of the first NAS storage apparatus path information, the second NAS storage apparatus path information, and the third NAS storage apparatus path information, is stored in the extended attribute data 420 in accordance with the state at that time.

Figure 8:
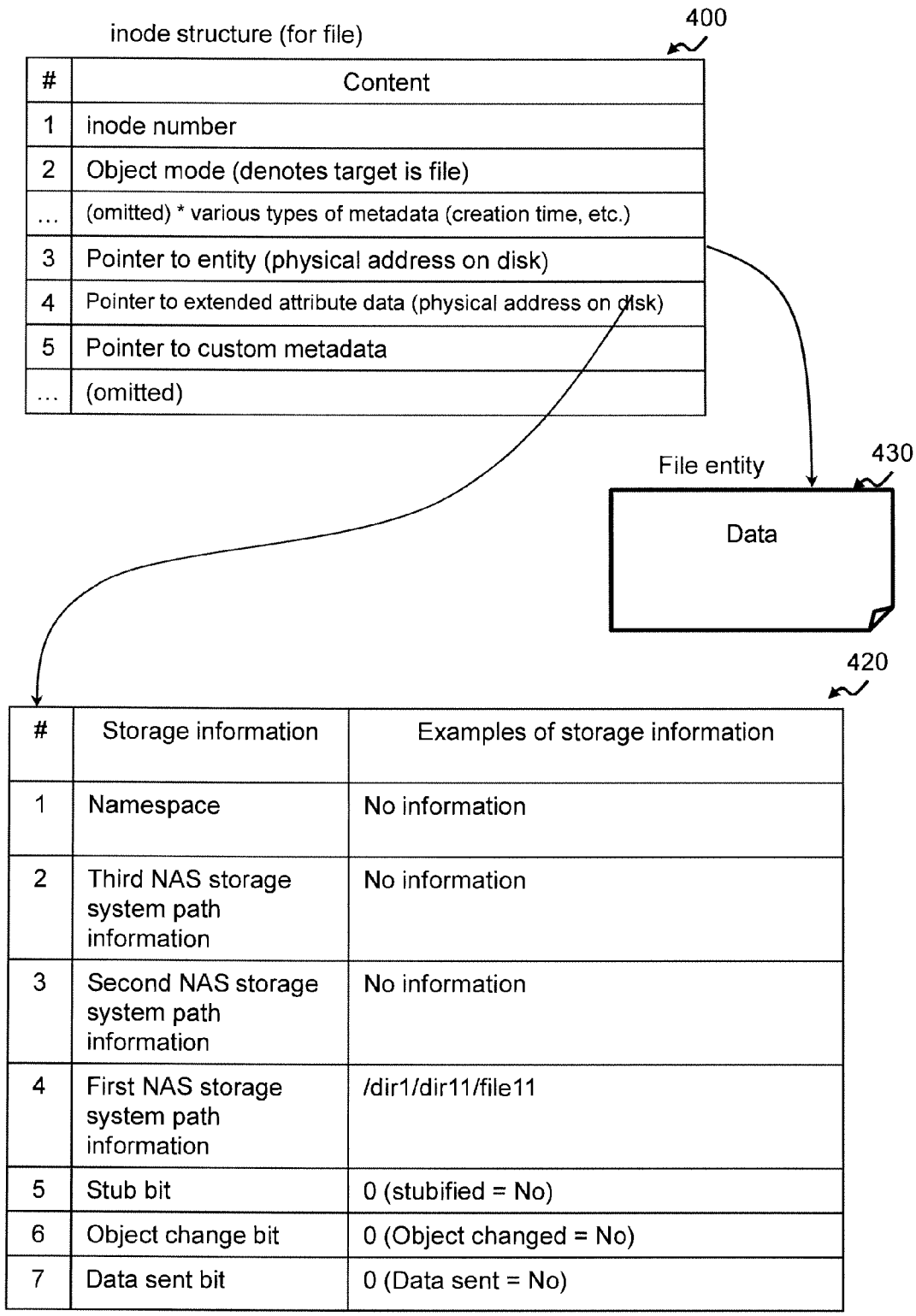
FIG. 8 is a diagram showing a first example of an entity-state object management structure related to the embodiment of the present invention.

FIG. 8 is a diagram showing a first example of an entity-state object management configuration related to the embodiment of the present invention. FIG. 8 shows the entity-state object management configuration at the time T6 shown in FIG. 1.

The entity-state object may be called the entity object here, may be called an entity file in a case where the object is a file, and may be called an entity directory in a case where the object is a directory. The entity object management structure includes the inode structure 400, the extended attribute data 420, and the object entity (file entity 430 or dentry list 410). An inode number, an object mode, a pointer to the entity, and a pointer to the extended attribute data are configured in the mode structure 400. An object entity storage path, which corresponds to the first NAS storage apparatus path information in the first NAS storage apparatus, is stored in the extended attribute data 420.

FIG. 9 is a diagram showing a second example of an entity-state object management configuration related to the embodiment of the present invention. FIG. 9 shows the entity-state object management configuration at the time T7 shown in FIG. 1.

The entity object management structure includes the inode structure 400, the extended attribute data 420, and the object entity (file entity 430 or dentry list 410). An inode number, an object mode, a pointer to the entity, and a pointer to the extended attribute data are configured in the mode structure 400. An object entity storage path, which corresponds to the second NAS storage apparatus path information in the second NAS storage apparatus 200, and an object entity storage path, which corresponds to the third NAS storage apparatus path information in the third NAS storage apparatus 300, are stored in the extended attribute data 420.

Next, the processing operations in the storage system related to the embodiment of the present invention will be explained.

Figure 10:
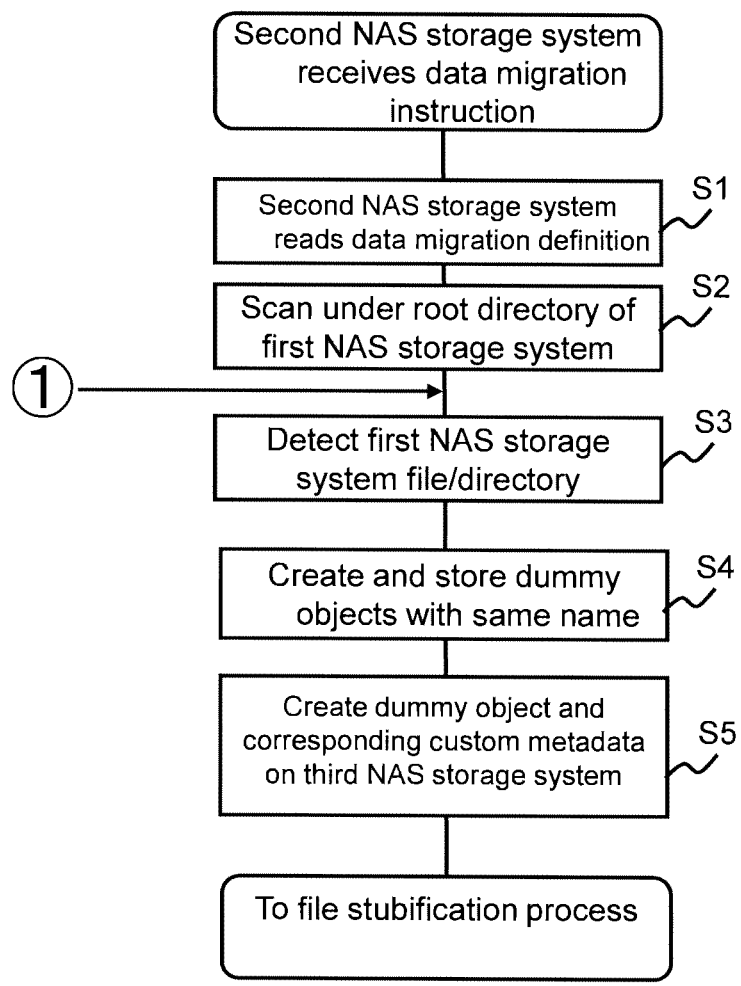
FIG. 10 is a flowchart of a data migration start process related to the embodiment of the present invention.

FIG. 10 is a flowchart of a data migration start process related to the embodiment of the present invention.

The data migration start process is started in accordance with the CPU 213 of the second NAS storage apparatus 200 having received a data migration instruction from the client 10. As the data migration instruction here, there is an on-demand migration instruction, which is an instruction for migrating a prescribed object only, and an all-objects migration instruction, which migrates all the objects. The on-demand migration process is one in which a target object is migrated from the first NAS storage apparatus 100 in a case where the second NAS storage apparatus 200 has received an instruction, such as file read/write to object, from the client computer.

The CPU 213 of the second NAS storage apparatus 200 requests root directory (shared directory) management information (a data migration definition: inode structure and dentry list) from the first NAS storage apparatus 100, and reads the management information (Step S1). The root directory management information here, for example, can be acquired from the first NAS storage apparatus 100 by specifying the root directory inode number (for example, 1). Also, at the least an object name and the inode number of the corresponding object are stored in the dentry list in the first NAS storage apparatus 100.

Next, the CPU 213 starts a scan of the objects directly under the root directory by referencing the dentry list in the acquired management information (Step S2). Next, the CPU 213 detects an object (file or directory) (Step S3), and creates a dummy object corresponding to the detected object, that is, a dummy object of the same name (refer to FIG. 6) inside the file system 225b of the storage medium 225 (Step S4). Next, the CPU 213 sends the dummy object to and stores this dummy object in the third NAS storage apparatus 300, and, in addition, creates custom metadata 440, which comprises the first NAS storage apparatus storage path of the corresponding object and a dummy object determination flag denoting that this object is a dummy object, and sends the custom metadata 440 to and stores this custom metadata 440 in the third NAS storage apparatus 300 (Step S5). In a case where the dummy object has been stored in the third NAS storage apparatus 300 here, the CPU 213 acquires the location information (uuid) for storing the corresponding object from the third NAS storage apparatus 300, and configures this uuid as the uuid of the relevant object in the dentry list 410 by using this object as the entry. Next, the CPU 213 advances the processing to the file stubification process (refer to FIG. 11).

Figure 11:
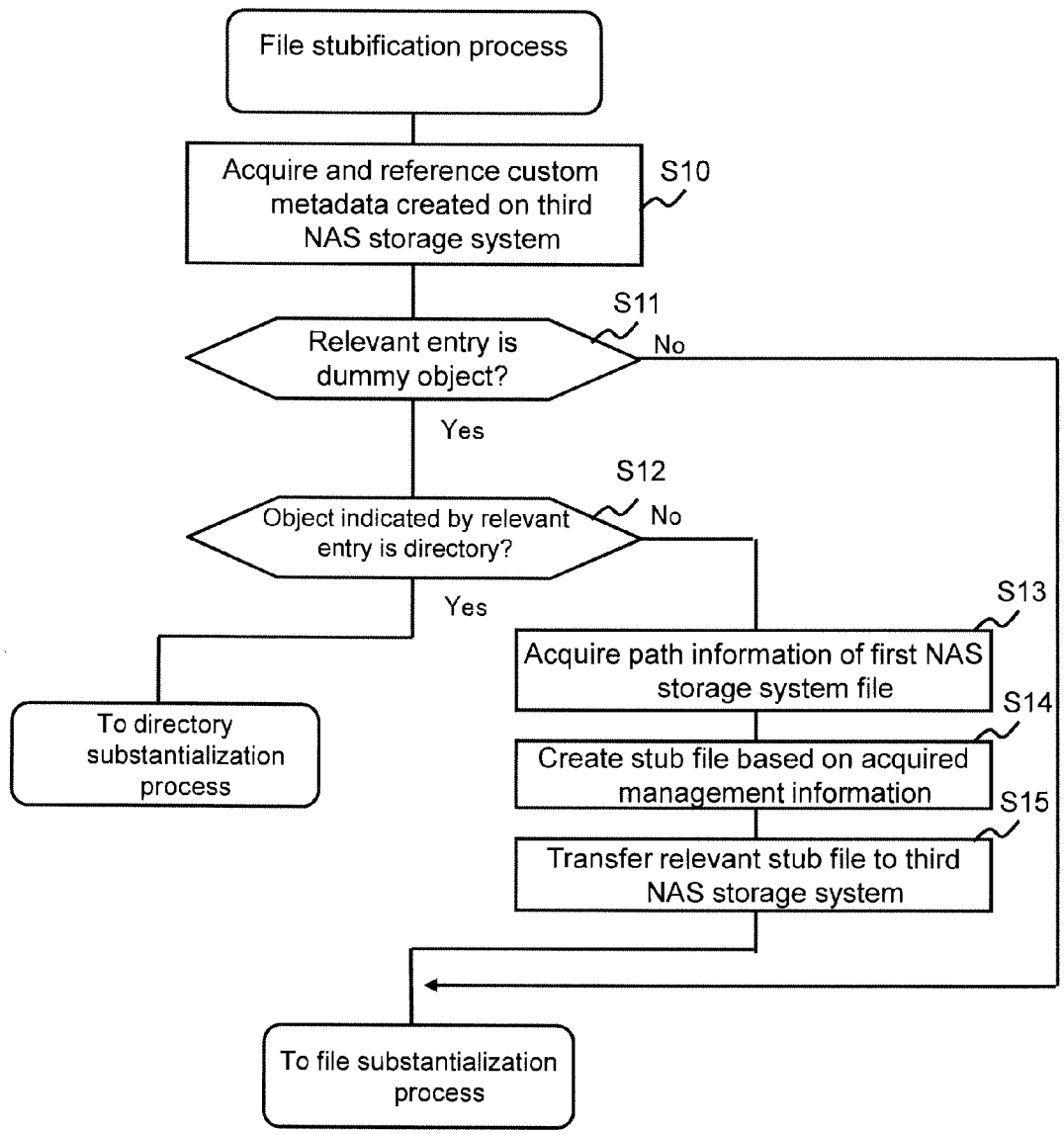
FIG. 11 is a flowchart of a file stubification process related to the embodiment of the present invention.

FIG. 11 is a flowchart of a file stubification process related to the embodiment of the present invention.

In the file stubification process, the CPU 213 acquires and references the custom metadata 440 of the corresponding object created on the third NAS storage apparatus 300 (Step S10). Here, the custom metadata 440 can be acquired from the third NAS storage apparatus 300 in accordance with the CPU 213 sending an information acquisition request comprising the uuid of the corresponding object and the information type denoting the custom metadata 440 to the third NAS storage apparatus 300.

Next, the CPU 213 determines whether or not the relevant entry (object) is a dummy object based on the dummy object determination flag in the custom metadata 440 (Step S11), and in a case where the relevant entry is not a dummy object (Step S11: No), advances the processing to the file substantialization process (refer to FIG. 12).

Alternatively, in a case where the relevant entry is a dummy object (Step S11: Yes), the CPU 213 determines whether or not the object of the relevant entry is a directory (Step S12). In a case where the object is a directory (Step S12: Yes), the CPU 213 advances the processing to the directory substantialization process (refer to FIG. 13). Alternatively, in a case where the object is not a directory, that is, a case in which the object is a file (Step S12: No), the CPU 213 acquires the path information of the corresponding object (a file in this case) from the first NAS storage apparatus 100 (Step S13), and based on this relevant path information, stubifies the dummy file to create a stub file (refer to FIG. 7). When the dummy file is stubified to create the stub file here, the CPU 213 prepares the extended attribute data 420 of the relevant file in the storage medium 225, configures a pointer to the extended attribute data 420 provided in the extended attribute pointer of the inode structure 400, and stores the acquired path information in the first NAS storage apparatus path information of the extended attribute data 420. Furthermore, the stub file shown in FIG. 7 denotes that the file path in the first NAS storage apparatus 100 is "/dir1/dir11/file1".

Figure 12:
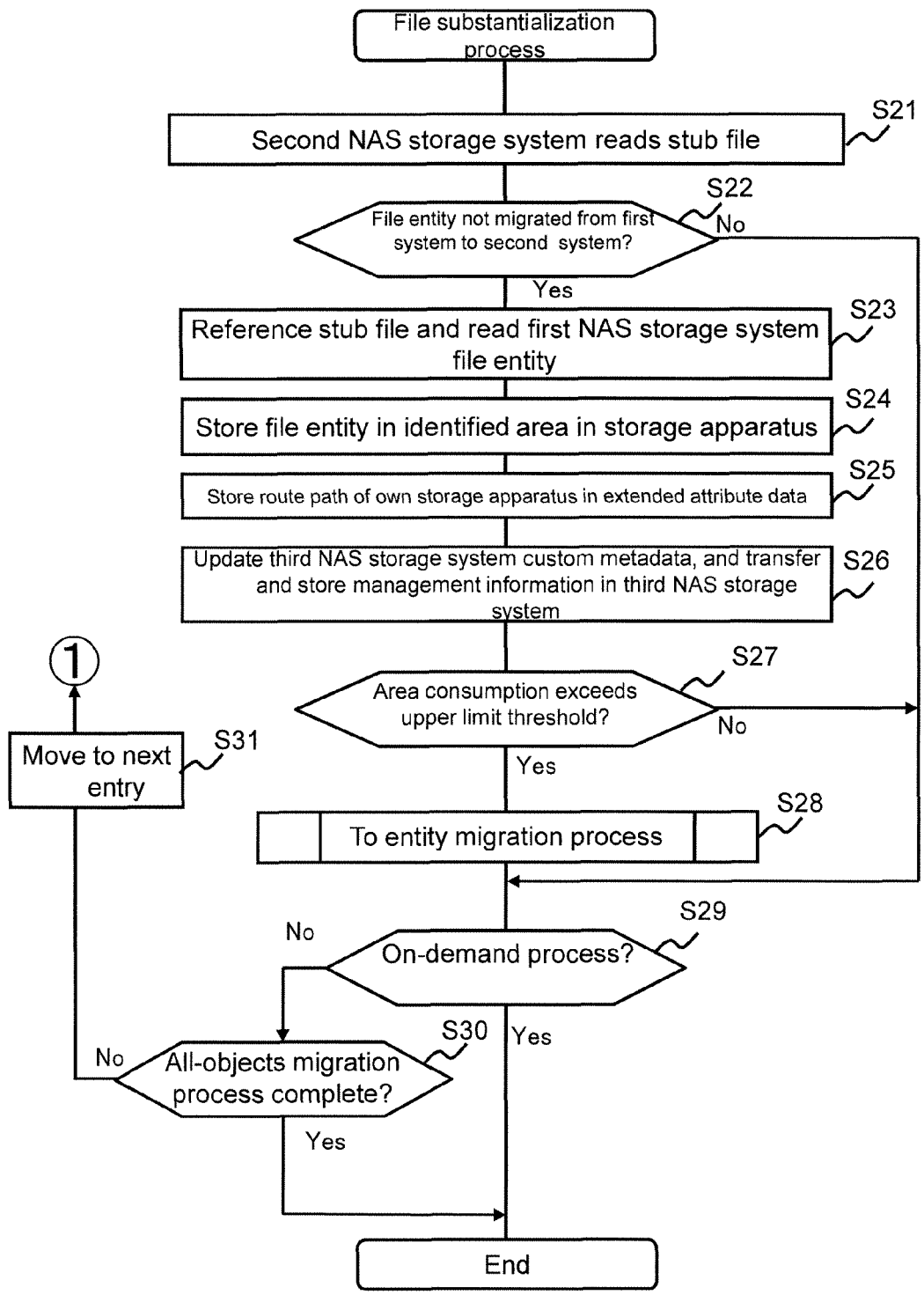
FIG. 12 is a flowchart of a file substantialization process related to the embodiment of the present invention.

Next, the CPU 213 transfers the stub file to the third NAS storage apparatus 300, stores this stub file as the stub file of the corresponding file (Step S15), and advances the processing to the file substantialization process (refer to FIG. 12).

FIG. 12 is a flowchart of a file substantialization process related to the embodiment of the present invention.

In the file substantialization process, the CPU 213 reads the stub file of the corresponding file from the storage medium 225 (Step S21), and determines whether or not the file entity of the corresponding file has yet to be migrated from the first NAS storage apparatus 100 to the second NAS storage apparatus 200 (Step S22). Whether the file entity is unmigrated or not can be determined here in accordance with whether or not there is a pointer to the object entity of the inode structure 400.

In a case where the file entity is not unmigrated (Step S22: No), the CPU 213 advances the processing to Step S29, and, alternatively, in a case where the file entity is unmigrated (Step S22: Yes), the CPU 213 acquires the first NAS storage apparatus 100 storage path of the corresponding file from the stub file, and using the relevant storage path, reads the corresponding file entity from the first NAS storage apparatus 100 (Step S23).

Next, the CPU 213 stores the read file entity in an identified area inside the storage medium 225, configures a storage-destination address in the pointer to the object entity of the inode structure 400 (Step S24), and stores the routing path on which the file entity has been stored in the second NAS storage apparatus path information of the extended attribute data 420 (Step S25). In this embodiment, the routing path is the same routing path as the routing path of the first NAS storage apparatus 100.

Next, the CPU 213 changes the dummy object determination flag in the custom metadata 440 corresponding to this file to a flag denoting that the file is not a dummy object, sends the relevant custom metadata 440 to the third NAS storage apparatus 300, stores the relevant custom metadata 440 as new custom metadata 440, and, in addition, transfers and stores the inode structure 400 and the extended attribute data 420, which are in the management information of this file, in the third NAS storage apparatus 300 (Step S26).

Next, the CPU 213 determines whether or not the consumption of the storage area (area consumption) in the file system-assigned storage area of the storage medium 225 has exceeded an upper limit threshold (Step S27), and in a case where the upper limit threshold has not been exceeded (Step S27: No), advances the processing to Step S29 since the indication is that the storage area has room, and, alternatively, in a case where the upper limit threshold has been exceeded (Step S27: Yes), executes an entity migration process (FIG. 14) to reduce the area consumption (Step S28), and after completing this process, advances the processing to Step S29. Furthermore, in this embodiment, a determination as to whether the area consumption exceeds an upper limit threshold is performed each time the migration of one object entity from the first NAS storage apparatus 100 to the second NAS storage apparatus 200 has been completed, but, for example, the CPU 213 may constantly make determinations as to whether or not area consumption exceeds the upper limit threshold and execute the entity migration process when an entity is being transferred, or may make a determination as to whether or not area consumption exceeds the upper limit threshold and execute the entity migration process each time the migration of a prescribed data unit (a block) has been completed.

In Step S29, the CPU 213 determines whether or not the relevant migration process is an on-demand process, and in the case of an on-demand process (Step S29: Yes), ends the processing.

Alternatively, in a case where the relevant migration process is not the on-demand process, that is, in the case of an all-objects migration (Step S29: No), the CPU 213 determines whether or not the all-objects migration process has been completed (Step S30), and in a case where the all-objects migration process has been completed (Step S30: Yes), ends the processing, and in a case where the all-objects migration process has not been completed (Step S30: No), makes the object of the next entry, which has not been processed, the processing target (Step S31), and advances the processing to Step S3 of FIG. 10.

Figure 13:
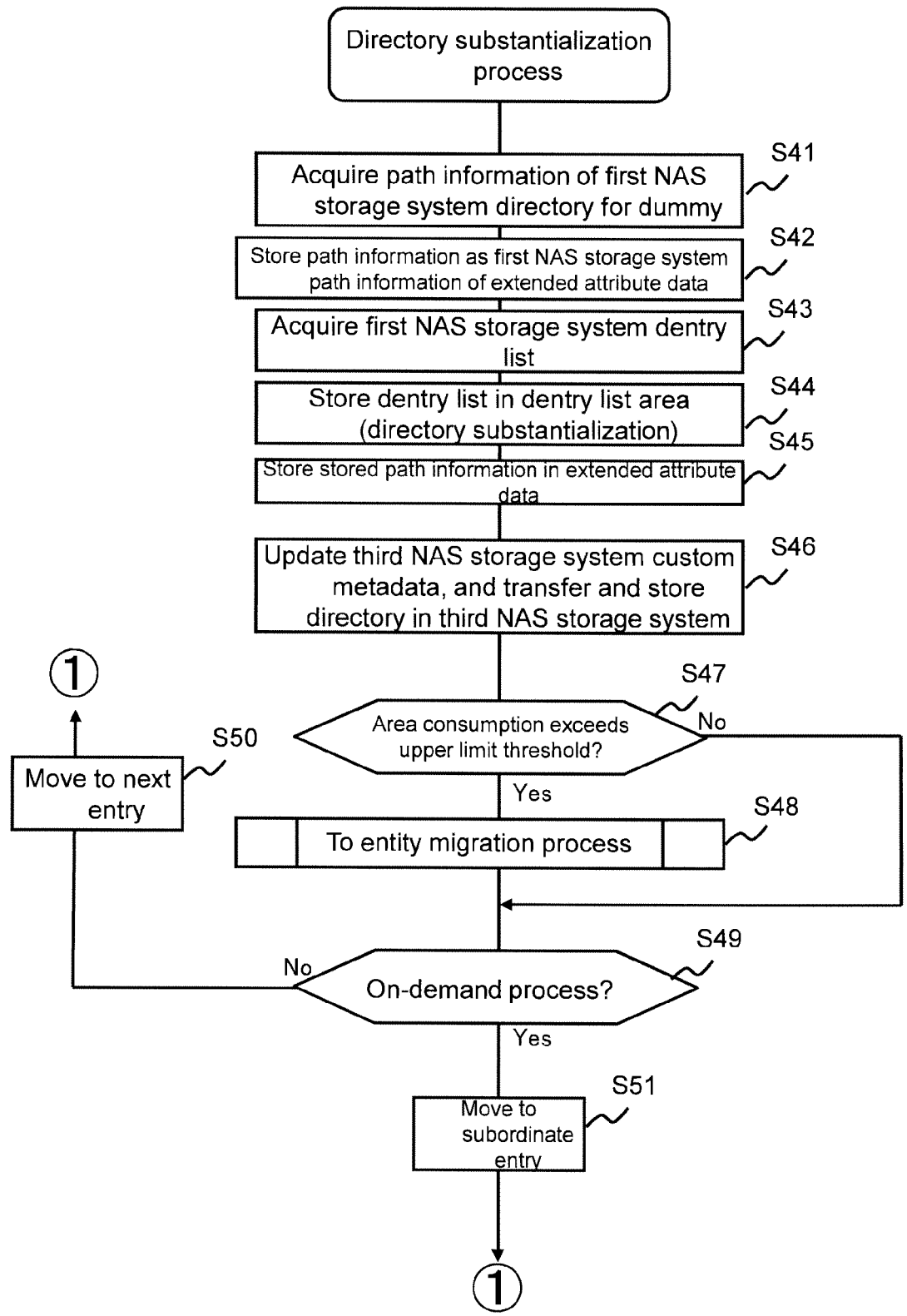
FIG. 13 is a flowchart of a directory substantialization process related to the embodiment of the present invention.

FIG. 13 is a flowchart of a directory substantialization process related to the embodiment of the present invention.

In the directory substantialization process, the CPU 213 acquires the path information of the corresponding object (a directory here) from the first NAS storage apparatus 100 (Step S41), prepares the extended attribute data 420 of the corresponding object in the storage medium 225, configures a pointer to the extended attribute data 420, which was prepared in the extended attribute data pointer of the inode structure 400, and stores the acquired path information in the first NAS storage apparatus path information of the extended attribute data 420 (Step S42).

Next, the CPU 213 acquires the dentry list of the corresponding object (a directory here) from the first NAS storage apparatus 100 (Step S43). The dentry list can be acquired here by sending a dentry list request instruction comprising the inode number of the first NAS storage apparatus 100 in the directory.

Next, the CPU 213, based on the acquired dentry list, prepares a dentry list 410 and stores this list in the dentry list area of the storage medium 225, and, in addition, stores the address, where the dentry list 410 was stored, in the pointer to the object entity of the inode structure 400 (Step S44). In accordance with this, the corresponding object is substantialized in the second NAS storage apparatus 200.

Next, the CPU 213 stores the path information (in this embodiment, the same information as the first NAS storage apparatus 100 path information), where the dentry list 410 was stored, in the second NAS storage apparatus path information of the extended attribute data 420 of the corresponding object (Step S45). Next, the CPU 213 changes the dummy object determination flag in the custom metadata 440 corresponding to this directory to a flag, which denotes that the object is not a dummy object, sends the relevant custom metadata 440 to the third NAS storage apparatus 300, stores the relevant custom metadata 440 as new custom metadata 440, and, in addition, transfers and stores the inode structure 400 and extended attribute data 420, which are in the management information of this directory, in the third NAS storage apparatus 300 (Step S46).

Next, the CPU 213 determines whether or not the consumption of the storage area (the area consumption) in the storage area assigned to the file system in the storage medium 225 exceeds an upper limit threshold (Step S47), and in a case where the upper limit threshold has not been exceeded (Step S47: No), advances the processing to Step S49 since the indication is that there is room in the storage area, and, alternatively, in a case where the upper limit threshold has been exceeded (Step S47: Yes), executes an entity migration process (FIG. 14) to reduce the area consumption (Step S48), and subsequent to this process ending, advances the processing to Step S49. Furthermore, in this embodiment, a determination as to whether or not the area consumption exceeds an upper limit threshold is performed each time the migration of one object entity from the first NAS storage apparatus 100 to the second NAS storage apparatus 200 has been completed, but, for example, the CPU 213 may constantly make determinations as to whether or not area consumption exceeds the upper limit threshold and execute the entity migration process when an entity is being transferred, or may make a determination as to whether or not area consumption exceeds the upper limit threshold and execute the entity migration process each time the migration of a prescribed data unit (a block) has been completed.

In Step S49, the CPU 213 determines whether or not the relevant migration process is an on-demand process, and in the case of an on-demand process (Step S49: Yes), makes the object under the relevant directory the processing target (Step S51), and advances the processing to Step S3 of FIG. 10.

Alternatively, in a case where the relevant migration process is not the on-demand process, that is, in the case of an all-objects migration (Step S49: No), the CPU 213 makes the object of the next entry, which has not been processed, the processing target (Step S50), and advances the processing to Step S3 of FIG. 10.

Figure 14:
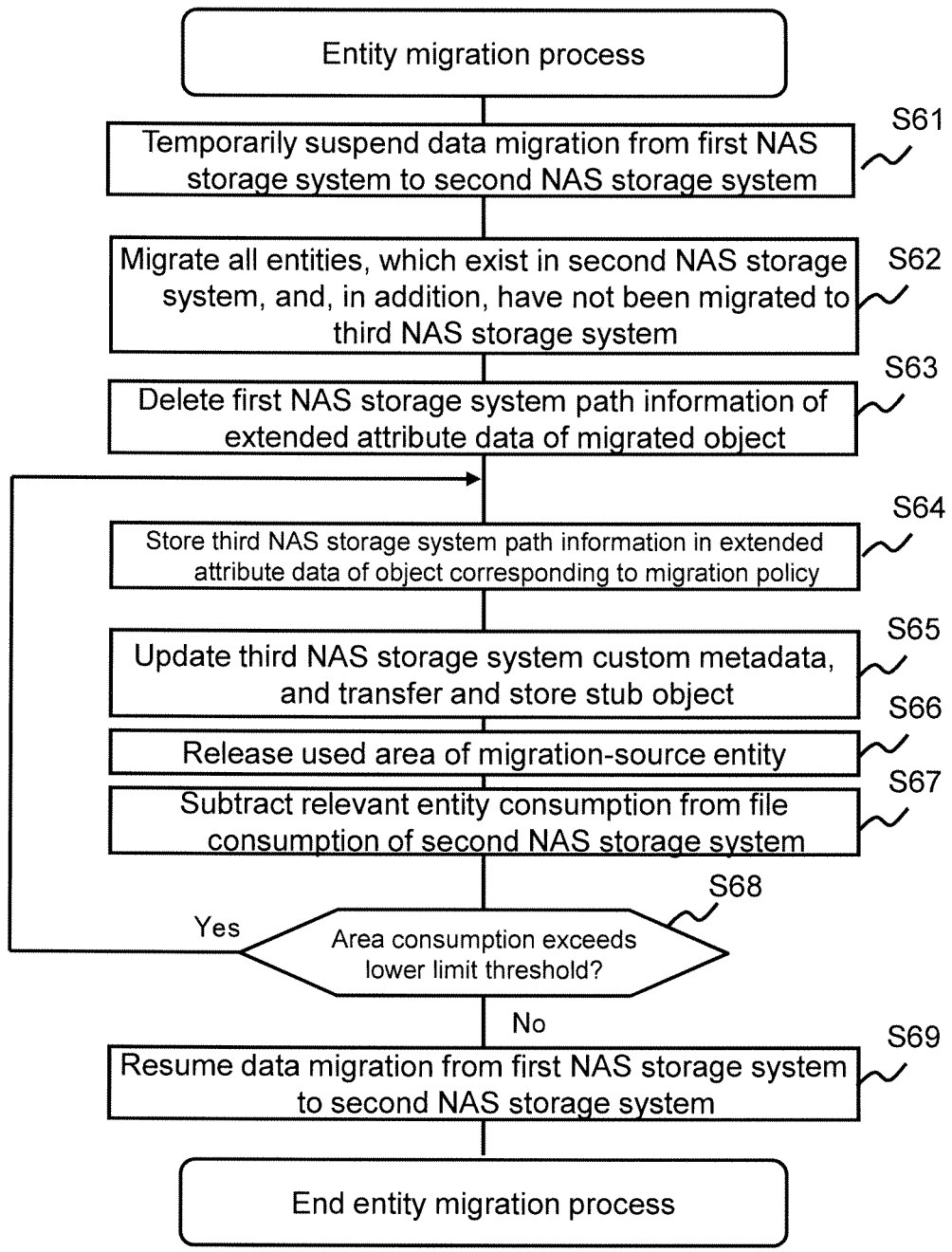
FIG. 14 is a flowchart of an entity migration process related to the embodiment of the present invention.

FIG. 14 is a flowchart of an entity migration process related to the embodiment of the present invention.

In the entity migration process, the CPU 213 temporarily suspends the migration of data from the first NAS storage apparatus 100 to the second NAS storage apparatus 200, and stores information identifying an object for which data migration has been completed as a log in the memory 212 (Step S61)

Next, the CPU 213 executes the migration of all the object entities, which exist in the second NAS storage apparatus 200, and, in addition, which have not been migrated to the third NAS storage apparatus 300 (Step S62). In this embodiment, the target of the entity migration is not only the object (s) in the process of being migrated from the first NAS storage apparatus 100 to the second NAS storage apparatus 200, but also an object(s), which has/have been newly created in the second NAS storage apparatus 200.

Next, the CPU 213 deletes the routing path stored in the first NAS storage apparatus path information of the migrated object(s) extended attribute data 420 (Step S63). Next, the CPU 213 stores the routing path of the third NAS storage apparatus 300, where the relevant object has been stored, in the third NAS storage apparatus path information of the extended attribute data 420 of the object corresponding to a prescribed migration policy (Step S64). In accordance with this, the object management structure is as shown in FIG. 9. The migration policy here, for example, stipulates that an object, which has not been accessed by the client 10 for a prescribed period of time subsequent to having been migrated from the first NAS storage apparatus 100 to the second NAS storage apparatus 200, is regarded as a migration target.

Next, the CPU 213 changes the dummy object determination flag in the custom metadata 440 corresponding to this object to a flag denoting that the object is not a dummy object, sends this custom metadata 440 to the third NAS storage apparatus 300, stores this custom metadata 440 as new custom metadata 440, and, in addition, transfers and stores the inode structure 400 and the extended attribute data 420, which are in the management information of this object, in the third NAS storage apparatus 300 (Step S65).

Next, the CPU 213 releases the used area of the source object entity on the storage medium 225 of the second NAS storage apparatus 200 (Step S66), and subtracts the consumption of the relevant object entity from the area consumption of the second NAS storage apparatus 200 (Step S67).

Next, the CPU 213 determines whether or not the area consumption exceeds a lower limit threshold (Step S68), and in a case where the lower limit threshold has been exceeded (Step S68: Yes), advances the processing to Step S64 since the area consumption must be reduced. Alternatively, in a case where the lower limit threshold has not been exceeded (Step S68: No), the CPU 213 acquires information identifying an object for which data migration has been completed from the log in the memory 212, resumes data migration with respect to the object, which is next in the sequence of objects identified in accordance with the relevant information (Step S69), and ends the entity migration process.

Next, a restore process, which is executed subsequent to a failure having occurred in the second NAS storage apparatus 200 and a storage medium (storage media) 225 of the second NAS storage apparatus 200 being replaced in the storage system related to this embodiment, will be explained.

The restore process includes an on-demand restore process, which makes it possible to use a certain identified object that has been specified, and an all-objects restore process for restoring all the objects.

Figure 15:
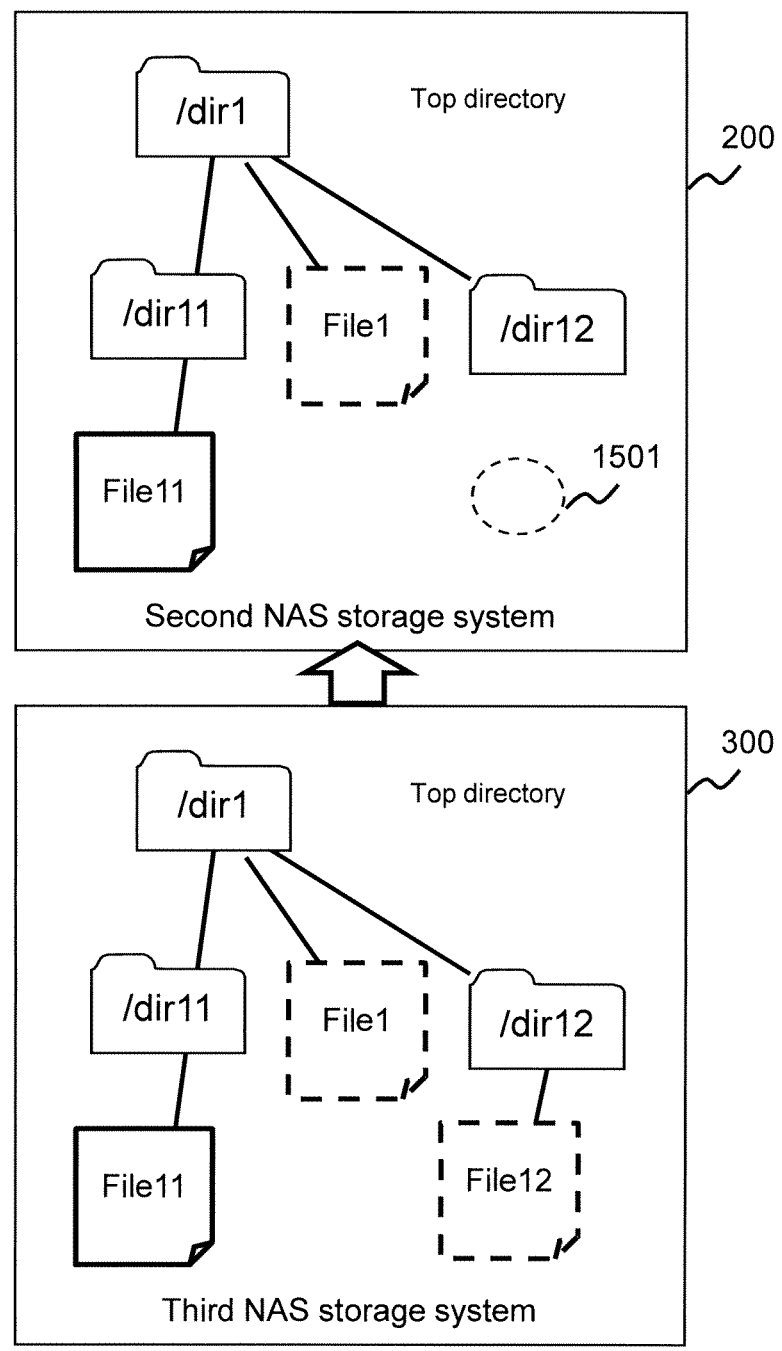
FIG. 15 is a diagram illustrating an overview of an on-demand restore process related to the embodiment of the present invention.

FIG. 15 is a diagram illustrating an overview of an on-demand restore process related to the embodiment of the present invention. In FIG. 15, a substantialized object is indicated by a solid line, and an object, which is either in the dummy state or the stub state, is indicated by a broken line.

As shown in FIG. 15, in a case where an object is being managed in the third NAS storage apparatus 300, and an on-demand restore instruction to make it possible to use "File11" is issued to the second NAS storage apparatus 200, the specified "File11" and objects ("/dir1", "/dir11") constituting the route thereof, and another directory ("/dir12") directly under the top directory ("/dir1") are substantialized in accordance with the restore process. Also, the file ("File1") directly under the top directory ("/dir1") is either dummified or stubified. An object ("File12") other than this is neither dummified nor stubified as indicated in area 1501.

Figure 16:
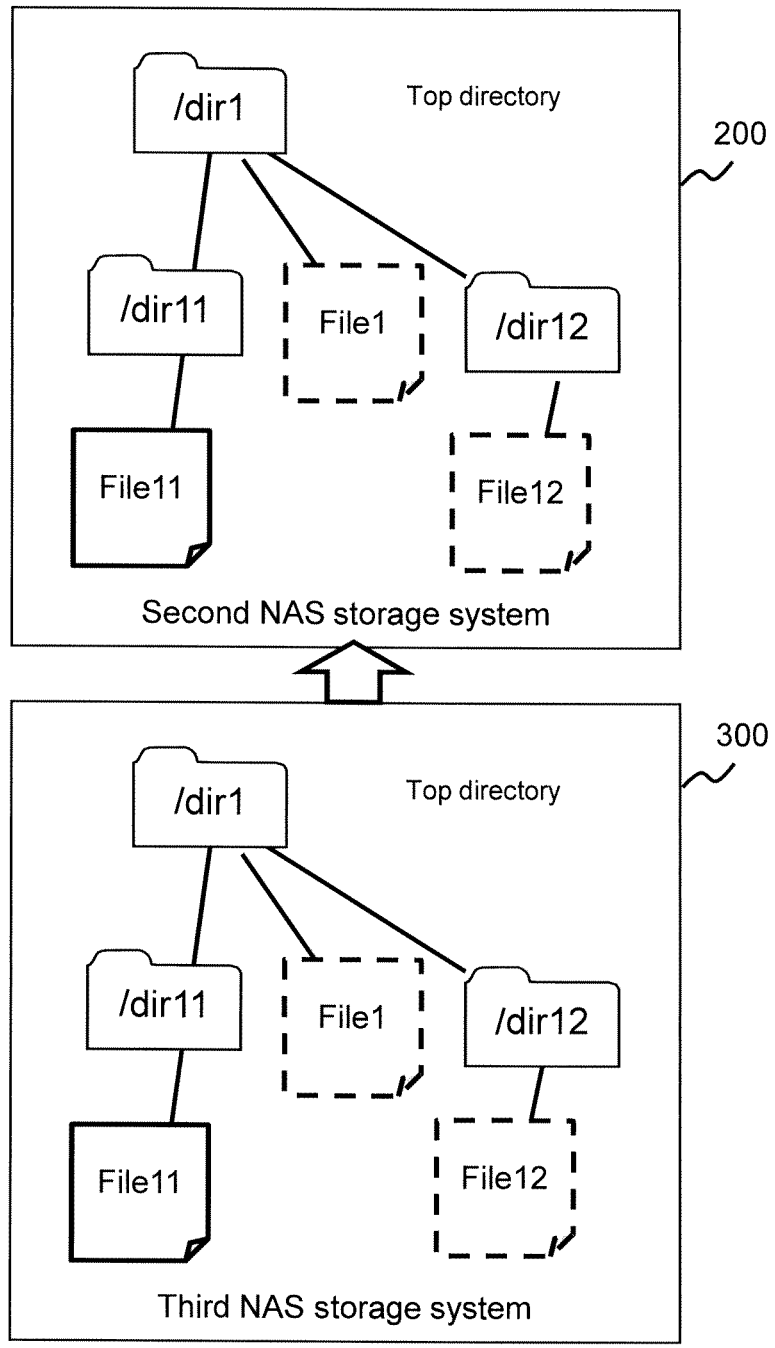
FIG. 16 is a diagram illustrating an overview of an all-objects restore process related to the embodiment of the present invention.

FIG. 16 is a diagram illustrating an overview of an all-objects restore process related to the embodiment of the present invention. In FIG. 16, a substantialized object is indicated by a solid line, and an object, which is either in the dummy state or the stub state, is indicated by a broken line.

As shown in FIG. 16, in a case where an object is being managed in the third NAS storage apparatus 300 and an all-objects restore instruction is issued to the second NAS storage apparatus 200, all the objects stored in the third NAS storage apparatus 300 are restored to the second NAS storage apparatus 200 in the same state in accordance with the restore process.

Figure 17:
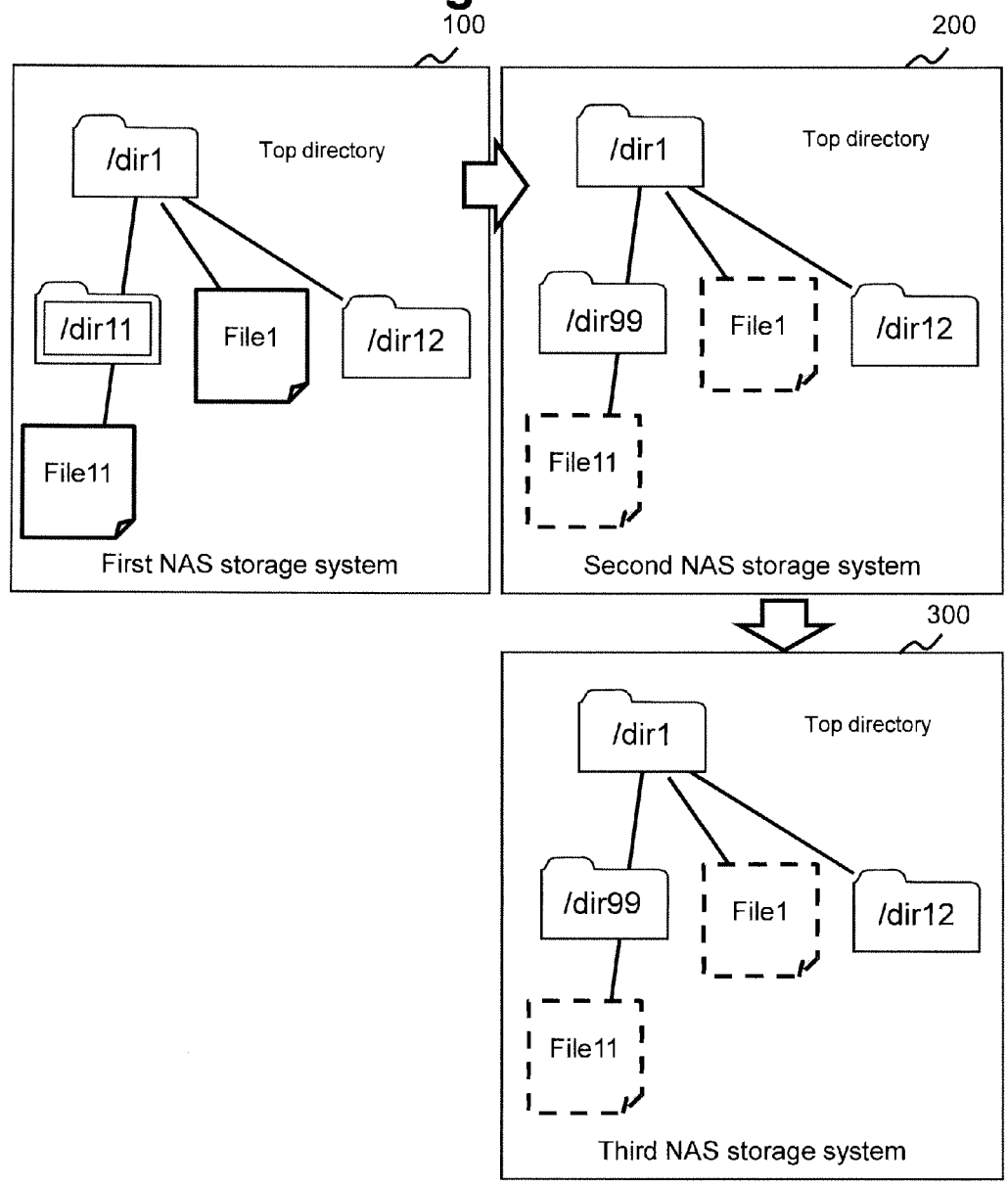
FIG. 17 is a diagram illustrating an overview of rename process related to the embodiment of the present invention.

FIG. 17 is a diagram illustrating an overview of a rename process related to the embodiment of the present invention. In FIG. 17, a substantialized object is indicated by a solid line, and an object, which is either in the dummy state or the stub state, is indicated by a broken line.

An explanation will be given using as an example a case in which the objects are being managed in the first NAS storage apparatus 100 as shown in FIG. 17. When the process for migrating the objects in the first NAS storage apparatus 100 to the second NAS storage apparatus 200 and the third NAS storage apparatus 300 is executed, the objects in the second NAS storage apparatus 200 and the third NAS storage apparatus 300, for example, are as shown in FIG. 16 while the migration process is in progress.

At this point in time, for example, in a case where there is an instruction to rename the "/dir11" as "/dir99" in the second NAS storage apparatus 200, as shown in FIG. 17, the directory, which was "/dir11" comes to be managed as "/dir99". At this point in time, the filename of "File11" becomes "/dir1/dir99/File11". When attempting to perform a restore using the filename in this case, the relevant file cannot be identified in the first NAS storage apparatus 100. In accordance with this, for example, subsequent to migrating the directory "/dir11" and the object(s) subordinate thereto from the first NAS storage apparatus 100 to the second NAS storage apparatus 200, the renaming of the directory from "/dir11" to "/dir99" can be realized, but the problem is that the processing takes time.

In contrast to this, in this embodiment, "/dir1/dir11/File11", which is the routing path in the first NAS storage apparatus 100 can be maintained and managed as-is in the custom metadata 440 corresponding to the relevant file, and the entity of the subordinate file of the renamed directory (/dir99) can be migrated from the first NAS storage apparatus 100 in a short period of time using this routing path of the custom metadata 440. Furthermore, "/dir1/dir11/File11", which is the routing path in the first NAS storage apparatus 100 stored in the extended attribute, may be used. In this case, it is also possible to reference the extended attribute in the second NAS storage apparatus in accordance with restoring the dummy file and performing stubification thereafter. Then, the effect of using the extended attribute in the second NAS storage apparatus is that the storage custom metadata 440 in the third NAS storage apparatus need not be referenced each time a restore is performed.

In addition, since the routing path in the custom metadata 440 is used, for example, even in a case where a different directory "/dir11" having the same name as prior to renaming is created in the second NAS storage apparatus 200, since the routing path of the first NAS storage apparatus 100 corresponding to the relevant directory does not exist, the migration of data from the first NAS storage apparatus 100 can be prevented.

Figure 18:
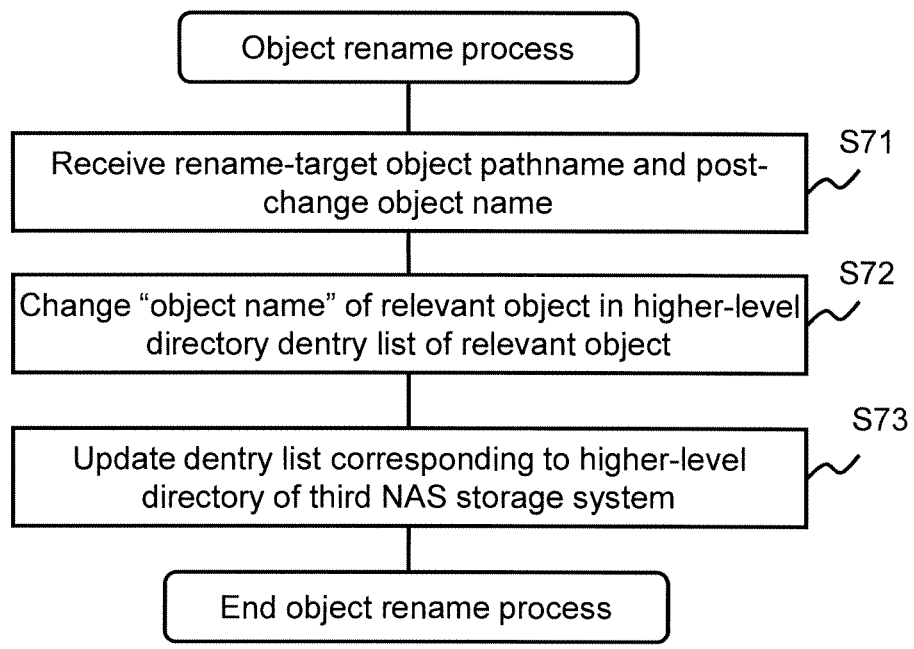
FIG. 18 is a flowchart of a rename process related to the embodiment of the present invention.

FIG. 18 is a flowchart of a rename process related to the embodiment of the present invention.

In the rename process, the CPU 213 of the second NAS storage apparatus 200 receives a rename-target object pathname and a post-change object name from the client 10 (Step S71), and changes the object name of the relevant object to the received post-change object name in the dentry list 410 of the higher-level directory of the relevant object (Step S72). Next, the CPU 213 sends the post-change dentry list 410 of the higher-level directory to the third NAS storage apparatus 300, and updates the dentry list 410 of the corresponding directory of the third NAS storage apparatus 300 to the post-change dentry list 410 (Step S73). In accordance with this, it becomes possible to identify the object by the post-change object name in the second NAS storage apparatus 200 and the third NAS storage apparatus 300. Also, in this rename process, the routing path of the first NAS storage apparatus 100 in the custom metadata 440 corresponding to the rename-target object is maintained without being changed, thereby making it possible to identify the corresponding object in the first NAS storage apparatus 100.

Next, a restore process related to the embodiment of the present invention will be explained.

Figure 19:
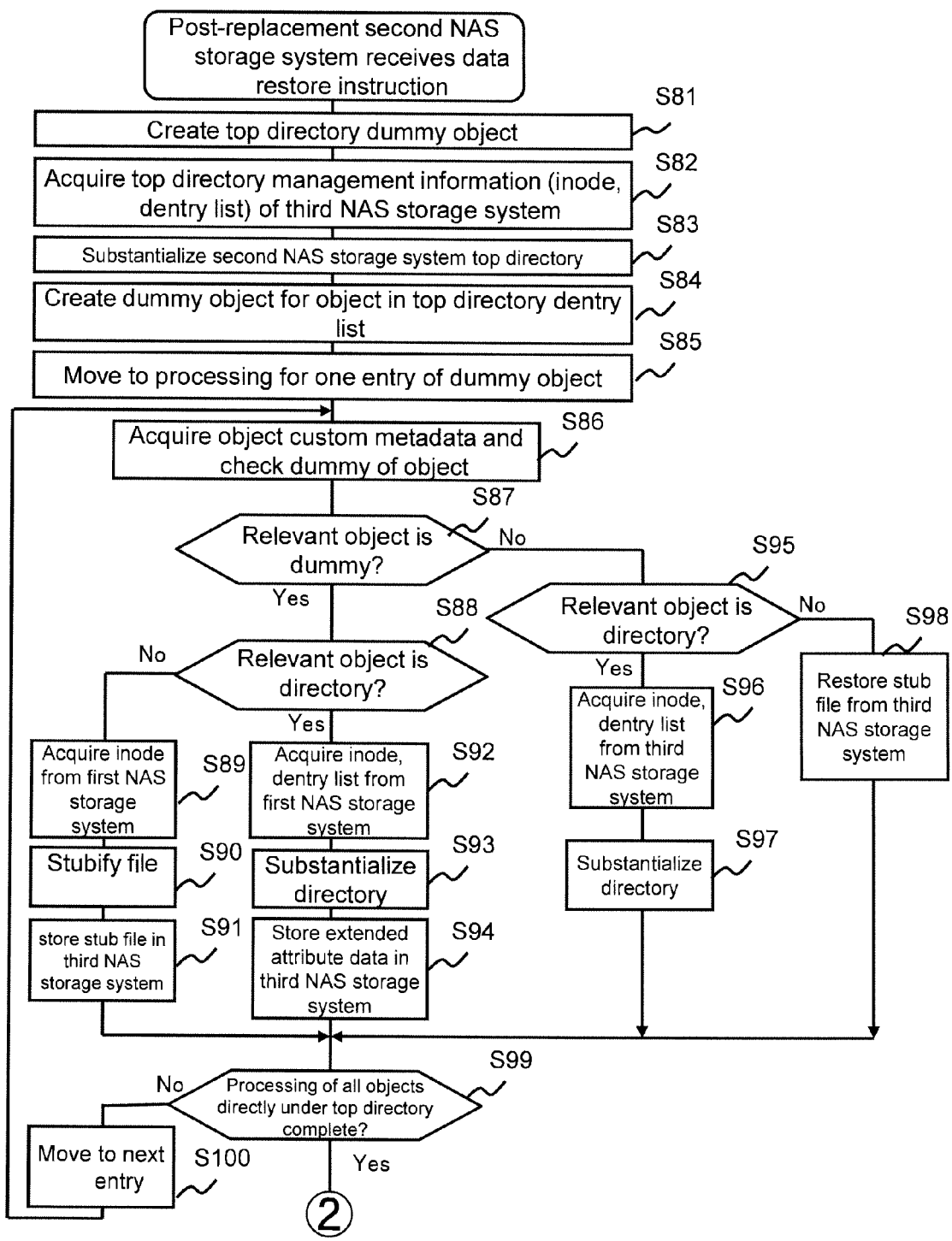
FIG. 19 is a first flowchart of a restore process related to the embodiment of the present invention.
Figure 20:
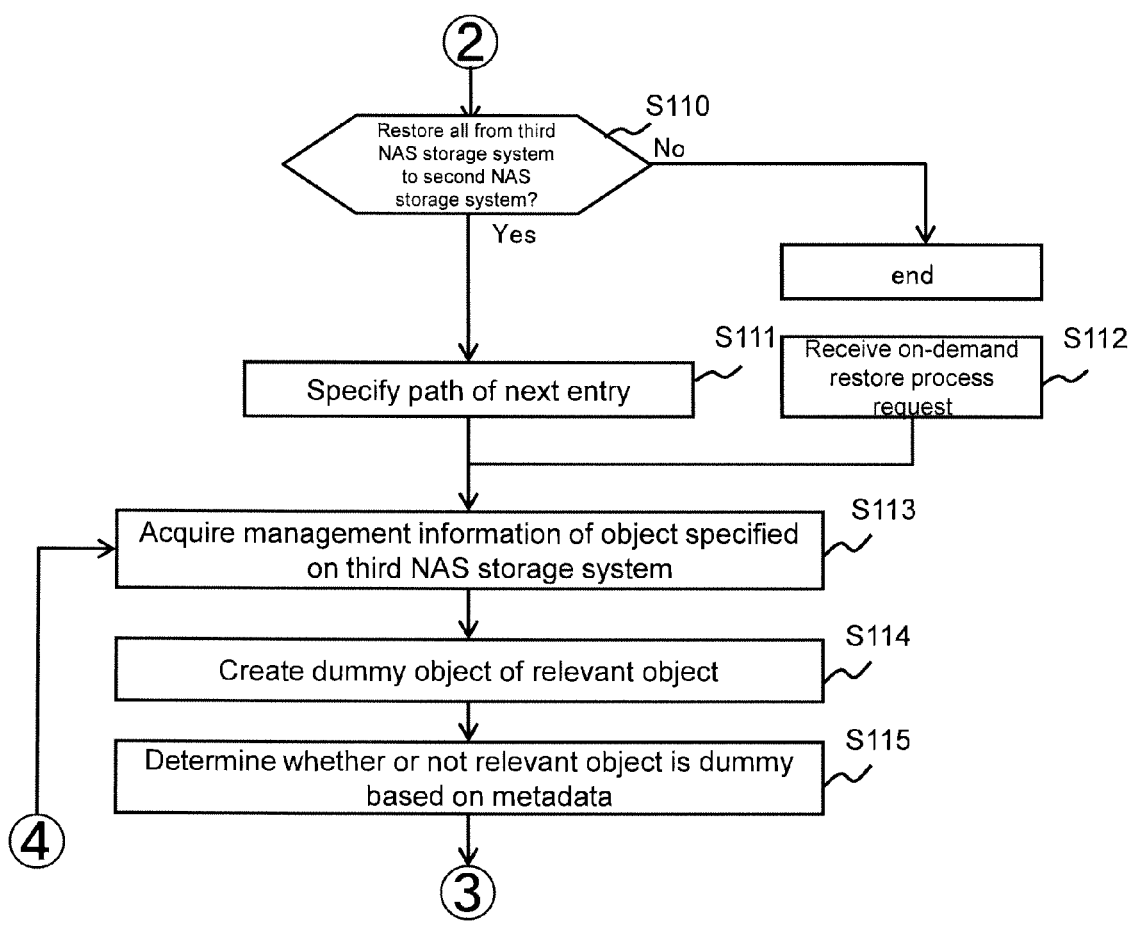
FIG. 20 is a second flowchart of the restore process related to the embodiment of the present invention.
Figure 21:
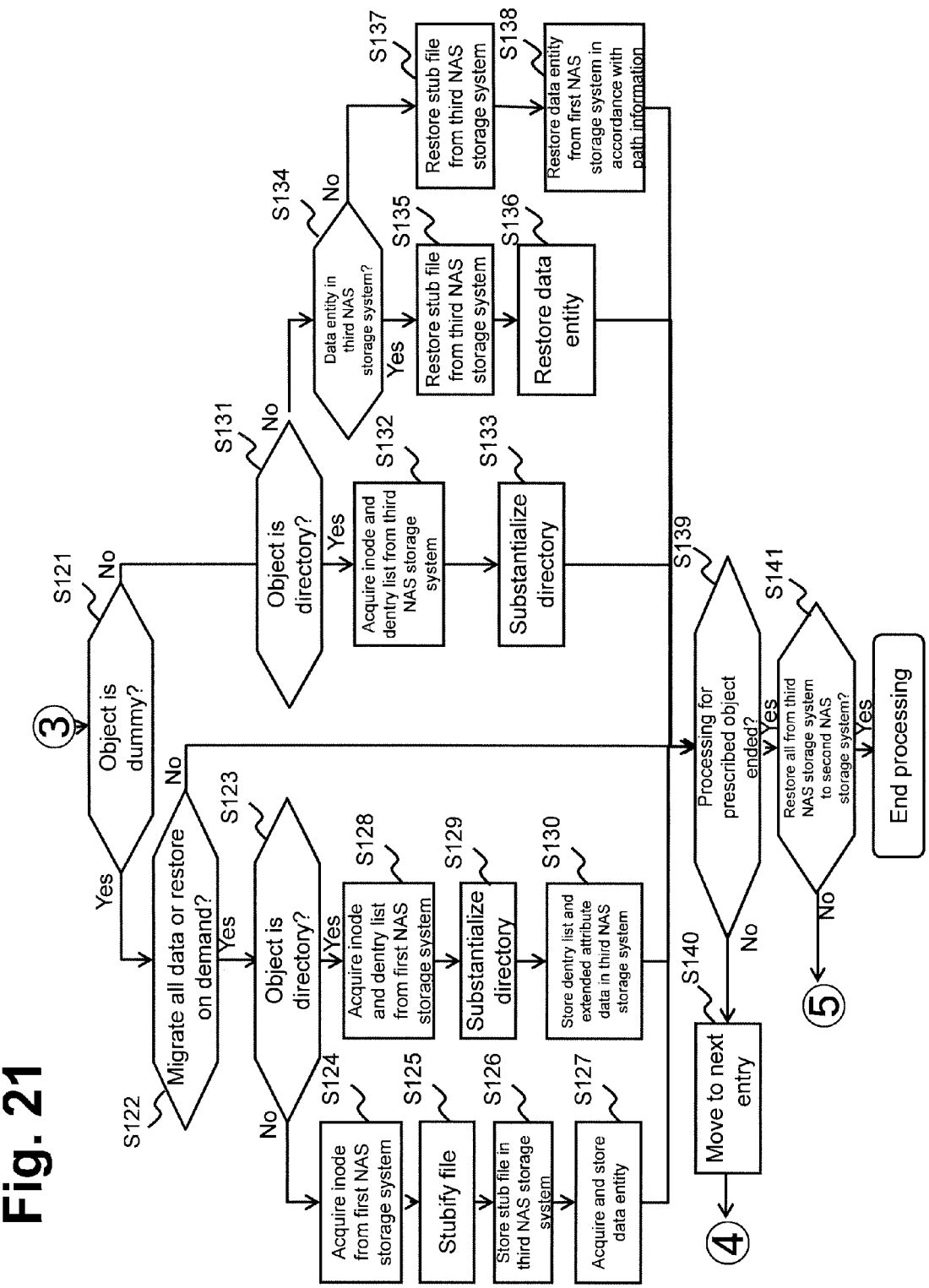
FIG. 21 is a third flowchart of the restore process related to the embodiment of the present invention.
Figure 22:
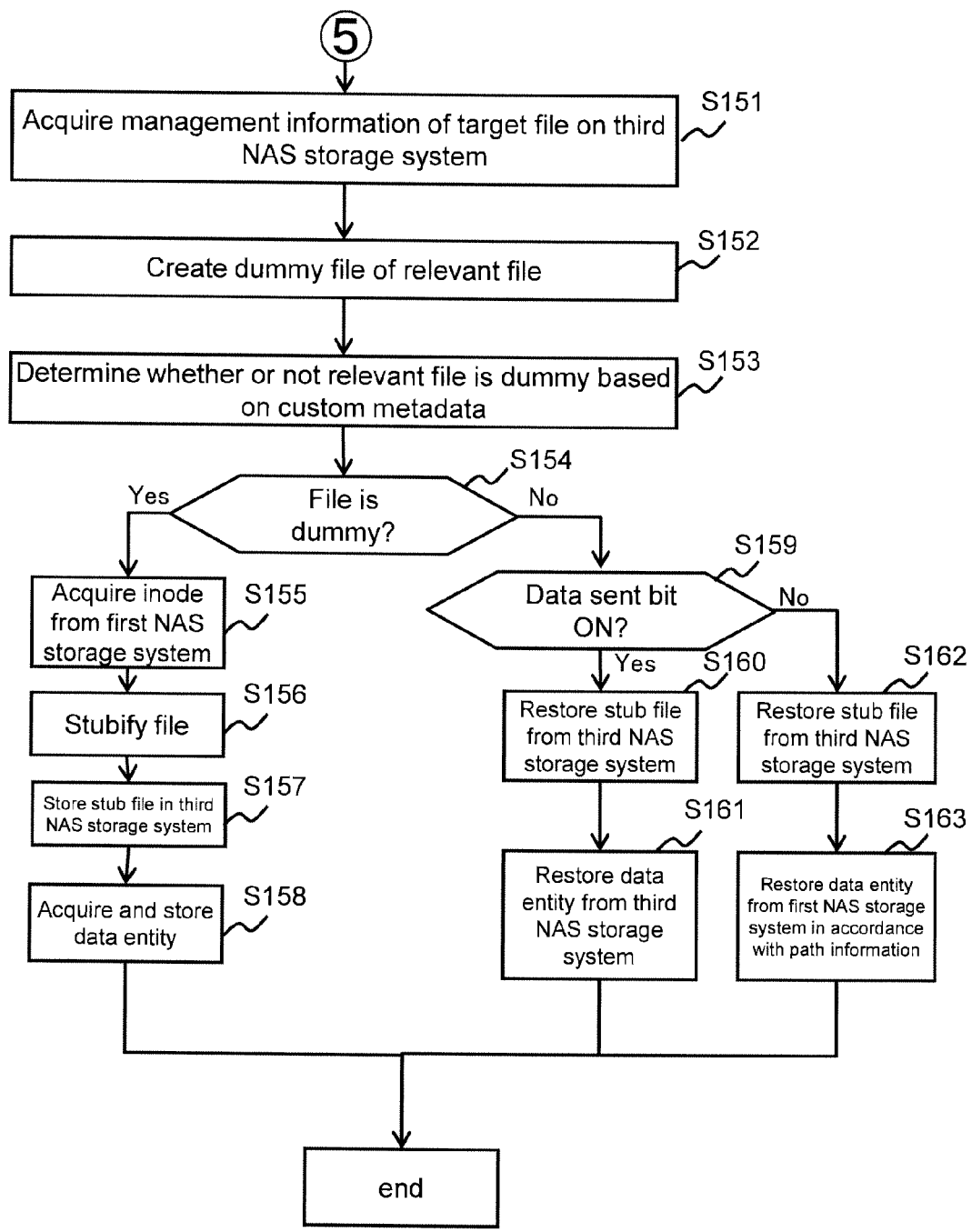
FIG. 22 is a fourth flowchart of the restore process related to the embodiment of the present invention.

FIG. 19 is a first flowchart of the restore process related to the embodiment of the present invention. FIG. 20 is a second flowchart of the restore process related to the embodiment of the present invention. FIG. 21 is a third flowchart of the restore process related to the embodiment of the present invention. FIG. 22 is a fourth flowchart of the restore process related to the embodiment of the present invention.

The restore process, for example, is executed after the storage medium (storage media) 225 of the second NAS storage apparatus 200 has been replaced in a case where a failure occurs in the second NAS storage apparatus 200 while object data is being migrated from the first NAS storage apparatus 100 to the second NAS storage apparatus 200.

The restore process is started when the CPU 213 of the second NAS storage apparatus 200 has received a restore instruction from the client 10 or the like. Furthermore, the restore process includes the following two processes.

1) A case in which all data is restored from the second NAS storage apparatus to the third NAS storage apparatus: In this case, all data is restored from the second NAS storage apparatus to the third NAS storage apparatus in accordance with the instruction. In a case where data is not migrated to the third NAS storage apparatus at this time, data is restored from the first NAS storage apparatus. In a case where the configuration is such that all data is restored from the first NAS storage apparatus to the second NAS storage apparatus, the data is restored, but in a case where data is restored on demand from the first NAS storage apparatus to the second NAS storage apparatus, the restore is performed separately from the process for restoring all the data from the second NAS storage apparatus to the third NAS storage apparatus when the client computer has accessed an object of the second NAS storage apparatus.

2) On demand: In this case, the restore is performed from either the first NAS storage apparatus or the second NAS storage apparatus when the client computer has accessed an object of the second NAS storage apparatus.

When the restore process is started, the CPU 213 creates a dummy object of the top directory (the root directory) in the storage medium 225 (Step S81). Specifically, the CPU 213 creates an mode structure 400 in which the inode number is "1" and the object mode denotes directory.

Next, the CPU 213 acquires the management information (inode structure 400, dentry list 410) of the top directory from the third NAS storage apparatus 300 (Step S82), and based on the top directory management information, which has been acquired, substantializes the top directory object(s) of the second NAS storage apparatus 200 (Step S83). Specifically, the CPU 213 stores the acquired dentry list 410 in a storage area of the storage medium 225 denoted by the acquired inode structure 400 pointer to the entity, and, in addition, stores this pointer in the top directory inode structure 400 of the storage medium 252.

Next, the CPU 213 creates dummy objects for all the objects, which exist in the dentry list 410 (Step S84), and moves to processing, which targets one of the created dummy objects (one entry of the dentry list 410) (Step S85)

The CPU 213 acquires the custom metadata 440 corresponding to the processing-target object from the third NAS storage apparatus 300, and checks the dummy object determination flag in the relevant custom metadata 440 (Step S86). The object custom metadata 440 can be acquired here by sending a data acquisition request, which comprises the uuid of the relevant object in the dentry list 410 and the type denoting the custom metadata 440, to the third NAS storage apparatus 300. Furthermore, it is also possible to acquire, update, and delete other information related to the object by sending to the third NAS storage apparatus 300 a request comprising the uuid corresponding to the object and the type denoting the target information.

The CPU 213, based on the dummy object determination flag, determines whether or not the corresponding object is a dummy in the third NAS storage apparatus 300 (Step S87), and in a case where the object is a dummy (Step S87: Yes), determines whether or not the relevant object is a directory (Step S88). Whether or not the object is a directory, for example, can be discerned by acquiring the inode structure 400 corresponding to the object from the third NAS storage apparatus 300, and referencing the object mode of the inode structure 400.

In a case where the object is not a directory, that is, a case in which the object is a file (Step S88: No), the CPU 213 uses a storage path, which is stored in the first NAS storage apparatus path information in the custom metadata 440, to acquire the inode structure 400 of this file from the first NAS storage apparatus 100 (Step S89), and create a stub file (refer to FIG. 7) by stubifying the dummy file stored in the second NAS storage apparatus 200 (Step S90). Specifically, the CPU 213 stores the extended attribute data 420 of the corresponding file in the storage medium 225, and, in addition, configures a pointer to the stored extended attribute data 420 in the extended attribute data pointer of the inode structure 400, and stores the storage path in the custom metadata in the first NAS storage apparatus path information of the extended attribute data 420.

Next, the CPU 213 transfers the created stub file to the third NAS storage apparatus 300, stores this stub file as the stub file of the corresponding file (Step S91), and advances the processing to Step S99. Furthermore, in a case where the second NAS storage apparatus 200 is configured so as to execute an all-objects restore, in Step S91, the CPU 213 also acquires the file entity from the first NAS storage apparatus 100, and stores the file entity in the storage medium 225 of the second NAS storage apparatus 200.

Alternatively, in a case where the object is a directory (Step S88: Yes), the CPU 213 uses the storage path stored in the first NAS storage apparatus path information in the custom metadata 400 to acquire the inode structure and dentry list of this file from the first NAS storage apparatus 100 (Step S92), and to create an entity object (refer to FIG. 3) by substantializing the dummy object stored in the second NAS storage apparatus 200 (Step S93). Specifically, the CPU 213, based on the acquired dentry list, creates the dentry list 410 in the storage medium 225, and, in addition, creates the extended attribute data 420 of the corresponding object. In addition, the CPU 213 configures a pointer to the created dentry list 410 in the pointer to the entity of the inode structure 400, configures a pointer to the created extended attribute data 420 in the extended attribute data pointer of the inode structure 400, and stores the storage path of the custom metadata 440 in the first NAS storage apparatus path information of the extended attribute data 420.

Next, the CPU 213 transfers and stores the inode structure 400 and extended attribute data 420 of this directory management information in the third NAS storage apparatus 300 (Step S94), and advances the processing to Step S99.

Alternatively, in a case where, based on the dummy object determination flag, the corresponding object is not a dummy (Step S87: No), the CPU 213 determines whether or not the relevant object is a directory (Step S95).

In a case where the result is that the object is a directory (Step S95: Yes), the CPU 213 acquires the inode structure 400 and the dentry list 410 corresponding to the directory from the third NAS storage apparatus 300 (Step S96), creates an entity object (refer to FIG. 3) in the second NAS storage apparatus 200 (Step S97), and advances the processing to Step S99. Specifically, the CPU 213 copies the acquired inode structure 400 to the storage medium 225, and, in addition, stores the acquired dentry list 410 in a storage area of the storage medium 225 denoted by the pointer to the entity of the acquired inode structure 400.

Alternatively, in a case where the object is not a directory, that is, a case in which the object is a file (Step S95: No), the CPU 213 acquires a stub file, that is, the inode structure 400 and extended attribute data 420 corresponding to the file from the third NAS storage apparatus 300, restores the inode structure 400 and the extended attribute data 420 in the storage medium 225 of the second NAS storage apparatus 200 (Step S98), and advances the processing to Step S99. Furthermore, in a case where the second NAS storage apparatus 200 is configured so as to execute an all-objects restore, in Step S98, the CPU 213 also acquires the file entity from the third NAS storage apparatus 300, and stores the file entity in a prescribed area of the storage medium 225 of the second NAS storage apparatus 200.

In Step S99, the CPU 213 determines whether or not all the objects directly under the top directory have been processed, and in a case where all the objects have not been processed (Step S99: No), moves to the next entry (Step S100) and moves the processing to Step S86. Alternatively, in a case where all of the objects have been processed (Step S99: Yes), the CPU 213 advances the processing to Step S110 shown in FIG. 20. According to the processing up until this point in time, the top directory and the object(s) thereunder are stubified and substantialized. Furthermore, in a case where the second NAS storage apparatus 200 is configured so as to execute an on-demand restore, the processing involved in file stubification (Steps S89 through 91, and S98) are not executed when the object is a file.

In Step S110 of FIG. 20, the CPU 213 determines whether or not the setting is for executing an all-objects restore from the third NAS storage apparatus to the second NAS storage apparatus (Step S110), and in a case where the setting is for executing an all-objects restore (Step S110: Yes), specifies the next entry path and advances the processing to Step S113, and, alternatively, in a case where it is not the setting for executing the all-objects restore, that is, a case in which the setting is for executing an on-demand restore (Step S110: No), ends the processing in this state, and thereafter, in a case where an on-demand restore process request is received from the client 10 (Step S112), advances the processing to Step S113. Furthermore, the on-demand restore process request comprises a specification for the path of the file targeted for the restore.

In Step S113, the CPU 213 acquires the management information of the object of the specified path (in the case of a setting for executing the on-demand restore, the directory of the specified path) from the third NAS storage apparatus 300 (Step S113), and creates a dummy object of the corresponding object in the second NAS storage apparatus 200 (Step S114). Next, the CPU 213 acquires the custom metadata 440 of the corresponding object from the third NAS storage apparatus 300, and based on the dummy object determination flag of the custom metadata 440, determines whether or not the relevant object is a dummy in the third NAS storage apparatus 300 (Step S115), and advances the processing to Step S121 of FIG. 21.

In Step S121 of FIG. 21, in a case where the relevant object is a dummy (Step S121: Yes), the CPU 213 determines whether the setting is for executing an all-objects migration from the first NAS storage apparatus 100 to the second NAS storage apparatus 200, or a setting for executing an on-demand restore (Step S122), and when neither is the case (Step S122: No), advances the processing to Step S139.

Alternatively, in a case where the setting is either for executing an all-objects migration from the first NAS storage apparatus 100 to the second NAS storage apparatus 200, or for executing an on-demand restore (Step S122: Yes), the CPU 213 determines whether or not the corresponding object is a directory (Step S123).

In a case where the object is not a directory, that is, in the case of a file (Step S123: No), the CPU 213 uses the storage path stored in the first NAS storage apparatus path information in the custom metadata 440 to acquire the inode structure 400 of this file from the first NAS storage apparatus 100 (Step S124), and creates a stub file (refer to FIG. 7) by stubifying the dummy file stored in the second NAS storage apparatus 200 (Step S125).

Next, the CPU 213 transfers the created stub file to the third NAS storage apparatus 300, stores this stub file as the stub file of the corresponding object (Step S126), acquires the file entity from the first NAS storage apparatus 100, stores the file entity in the storage medium 225 of the second NAS storage apparatus 200 (Step S127), and advances the processing to Step S139.

Alternatively, in a case where the object is a directory (Step S123: Yes), the CPU 213 uses the storage path stored in the first NAS storage apparatus path information in the custom metadata 440 to acquire the inode structure and dentry list of this file from the first NAS storage apparatus 100 (Step S128), and creates an entity object (refer to FIG. 3) by substantializing the dummy object stored in the second NAS storage apparatus 200 (Step S129).

Next, the CPU 213 transfers and stores the inode structure 400 and the extended attribute data 420, which are in the management information of this directory, in the third NAS storage apparatus 300 (Step S130), and advances the processing to Step S139.

Alternatively, in a case where, based on the dummy object determination flag, the corresponding object is not a dummy (Step S121: No), the CPU 213 determines whether or not the relevant object is a directory (Step S131).

In a case where the result is that the object is a directory (Step S131: Yes), the CPU 213 acquires the inode structure 400 and dentry list 410 corresponding to the directory from the third NAS storage apparatus 300 (Step S132), creates an entity object (refer to FIG. 3) in the second NAS storage apparatus 200 (Step S133), and advances the processing to Step S139.

Alternatively, in a case where the object is not a directory, that is, in the case of a file (Step S131: No), the CPU 213 determines whether or not there is an object entity in the third NAS storage apparatus 300 (Step S134).

In a case where the result is that there is an object entity in the third NAS storage apparatus 300 (Step S134: Yes), the CPU 213 acquires the inode structure 400 and the extended attribute data 420 corresponding to this file from the third NAS storage apparatus 300, restores the inode structure 400 and the extended attribute data 420 in the storage medium 225 of the second NAS storage apparatus 200 (Step S135), acquires the file entity from the third NAS storage apparatus 300, stores the file entity in the storage medium 225 of the second NAS storage apparatus 200 (Step S136), and advances the processing to Step S139.

Alternatively, in a case where an object entity does not exist in the third NAS storage apparatus 300 (Step S134: No), the CPU 213 acquires the inode structure 400 and the extended attribute data 420 corresponding to this file from the third NAS storage apparatus 300, and restores the inode structure 400 and the extended attribute data 420 in the storage medium 225 of the second NAS storage apparatus 200 (Step S137). Next, the CPU 213, based on the routing path of the first NAS storage apparatus path information of the extended attribute data 420, acquires the file entity from the first NAS storage apparatus 100, stores the file entity in the storage medium 225 of the second NAS storage apparatus 200 (Step S138), and advances the processing to Step S139.

In Step S139, the CPU 213 determines whether or not the processing with respect to the prescribed object has ended. The prescribed object here is all of the objects in a case where the setting is for executing the all-objects restore, and is the directory, which is storing the target file, in a case where the setting is for executing the on-demand restore.

In a case where the result is that processing with respect to the prescribed object has not ended (Step S139: No), the CPU 213 moves the processing target to the next entry (in a case where the setting is for executing an on-demand restore, the next (lower level) directory in the specified path) (Step S140), and moves the processing to Step S113 of FIG. 20. Alternatively, in a case where the processing with respect to the prescribed object has ended (Step S139: Yes), the CPU 213 determines whether or not it is an all-objects restore (Step S141), and in a case where the setting is for executing the all-objects restore (Step S141: Yes), ends the processing, and alternatively, in a case where it is not the setting for executing the all-objects restore (Step S141: No), advances the processing to Step S151 of FIG. 22. At this point in time, for example, in a case where the path of the file, which is the target of the on-demand restore, is "dir0/dir1/dir2/file1", the directories dir0, dir1, and dir2 constitute a substantialized state.

In Step S151 of FIG. 22, the CPU 213 acquires the management information of the on-demand restore target file from the third NAS storage apparatus 300 (Step S151), and based on the acquired management information, creates a dummy file of the corresponding file in the second NAS storage apparatus 200 (Step S152). Next, the CPU 213 acquires the custom metadata 440 of the corresponding file from the third NAS storage apparatus 300, and based on the dummy object determination flag of the custom metadata 440, determines whether or not the relevant file is a dummy in the third NAS storage apparatus 300 (Step S153).

In a case where the result is that the relevant file is a dummy (Step S154: Yes), the CPU 213 uses the storage path stored in the first NAS storage apparatus path information in the custom metadata 440 to acquire the inode structure 400 of this file from the first NAS storage apparatus 100 (Step S155), and creates a stub file (refer to FIG. 7) by stubifying the dummy file stored in the second NAS storage apparatus 200 (Step S156).

Next, the CPU 213 transfers the created stub file to the third NAS storage apparatus 300, stores this stub file as the stub file of the corresponding file (Step S157), acquires the file entity from the first NAS storage apparatus 100, stores the file entity in the storage medium 225 of the second NAS storage apparatus 200 (Step S158), and ends the processing.

Alternatively, in a case where the file is not a dummy (Step S154: No), the CPU 213 acquires the extended attribute data 420 corresponding to the relevant file stored in the third NAS storage apparatus 300, and determines whether or not the data sent bit of the extended attribute data 420 is ON (Step S159).

In a case where the result is that the data sent bit is ON (Step S159: Yes), the CPU 213 acquires the inode structure 400 and the extended attribute data 420 corresponding to the file from the third NAS storage apparatus 300, restores the inode structure 400 and the extended attribute data 420 in the storage medium 225 of the second NAS storage apparatus 200 (Step S160), acquires the file entity from the third NAS storage apparatus 300, stores the file entity in the storage medium 225 of the second NAS storage apparatus 200 (Step S161), and ends the processing.

Alternatively, in a case where the data sent bit is not ON (Step S159: No), the CPU 213 acquires the inode structure 400 and the extended attribute data 420 corresponding to the file from the third NAS storage apparatus 300 and restores the inode structure 400 and the extended attribute data 420 in the storage medium 225 of the second NAS storage apparatus 200 (Step S162). Next, the CPU 213, based on the routing path of the first NAS storage apparatus path information of the extended attribute data 420, acquires the file entity from the first NAS storage apparatus 100, stores the file entity in the storage medium 225 of the second NAS storage apparatus 200 (Step S163), and ends the processing. According to the processing of Steps S151 through S163, the file entity of the on-demand restore target file is restored in the storage medium 225 of the second NAS storage apparatus 200.

Next, a variation of the storage system related to the embodiment of the present invention will be explained. Furthermore, since the configuration of the storage system related to the variation is the same as that of the storage system shown in FIG. 2, the explanation will be given using the reference signs of FIG. 2.

In the storage system related to the variation, an object, which has been deleted in the second NAS storage apparatus 200, is not restored in an all-objects restore process.

Figure 23:
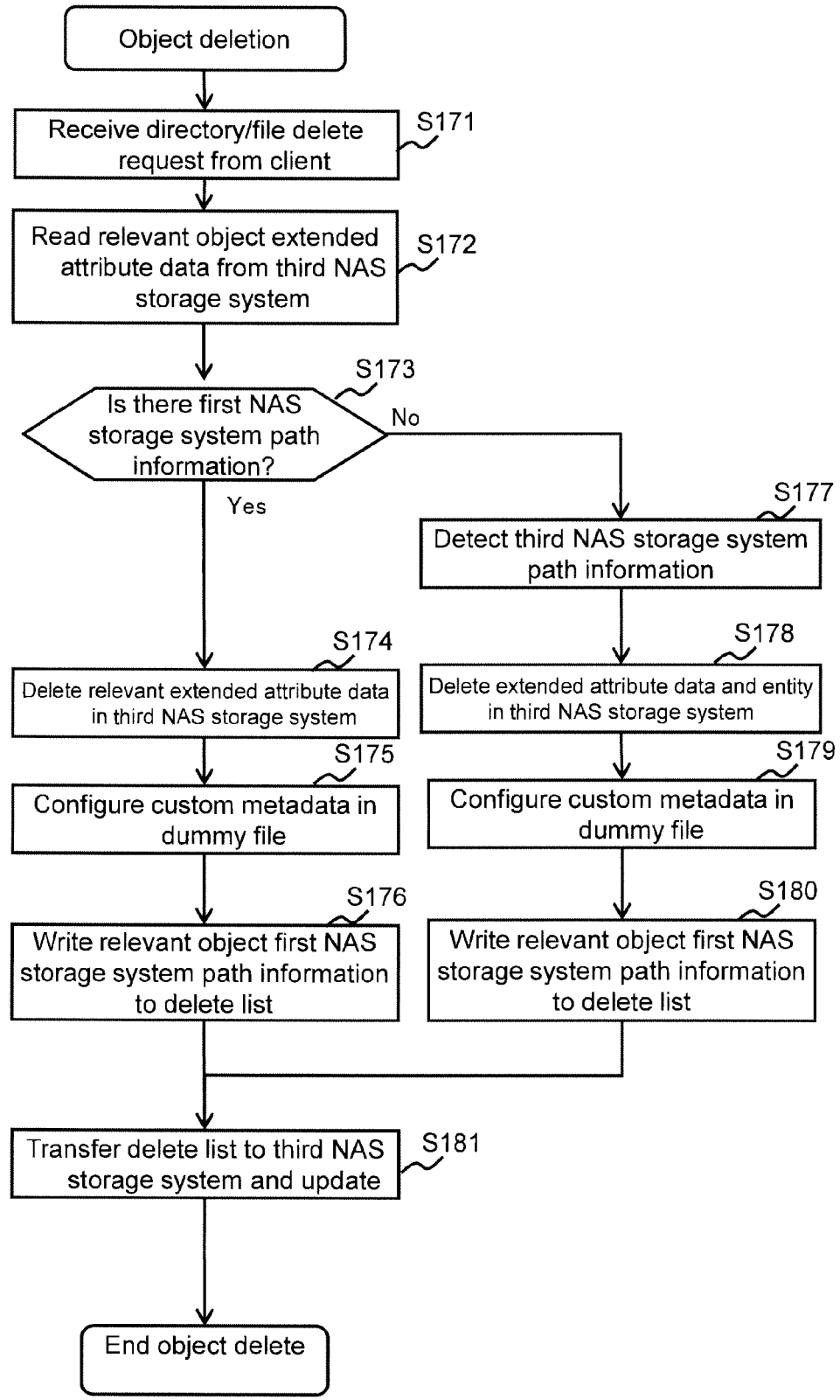
FIG. 23 is a flowchart of an object delete process related to a variation of the present invention.

FIG. 23 is a flowchart of an object delete process related to the variation of the present invention.

In the object delete process, the CPU 213 of the second NAS storage apparatus 200, upon receiving a deletion request from the client 10 having an object as the target (Step S171), reads the extended attribute data 420 of the delete-target object from the third NAS storage apparatus 300 (Step S172), and determines whether or not first NAS storage apparatus 100 path information is stored in the extended attribute data 420 (Step S173).

In a case where the result is that the first NAS storage apparatus 100 path information is being stored (Step S173: Yes), the CPU 213 deletes the extended attribute data 420 in the third NAS storage apparatus 300 (Step S174), configures the dummy object determination flag in the custom metadata 440 of the third NAS storage apparatus 300 to the flag denoting a dummy object (Step S175), adds the relevant object routing path in the first NAS storage apparatus 100 to a deletion list in the storage medium 225 of the second NAS storage apparatus 200 (Step S176), and advances the processing to Step S181.

Alternatively, in a case where the first NAS storage apparatus 100 path information is not being stored (Step S173: No), the CPU 213 retrieves the third NAS storage apparatus 300 path information in the extended attribute data 420 (Step S177), deletes the extended attribute data 420 and the object entity in the third NAS storage apparatus 300 (Step S178), configures the dummy object determination flag in the custom metadata 440 of the third NAS storage apparatus 300 to the flag denoting a dummy object (Step S179), adds the relevant object routing path of the first NAS storage apparatus 100 in the custom metadata 440 to the deletion list in the storage medium 225 of the second NAS storage apparatus 200 (Step S180), and advances the processing to Step S181.

In Step S181, the CPU 213 transfers and stores the storage medium 225 deletion list in the third NAS storage apparatus 300.

Figure 24:
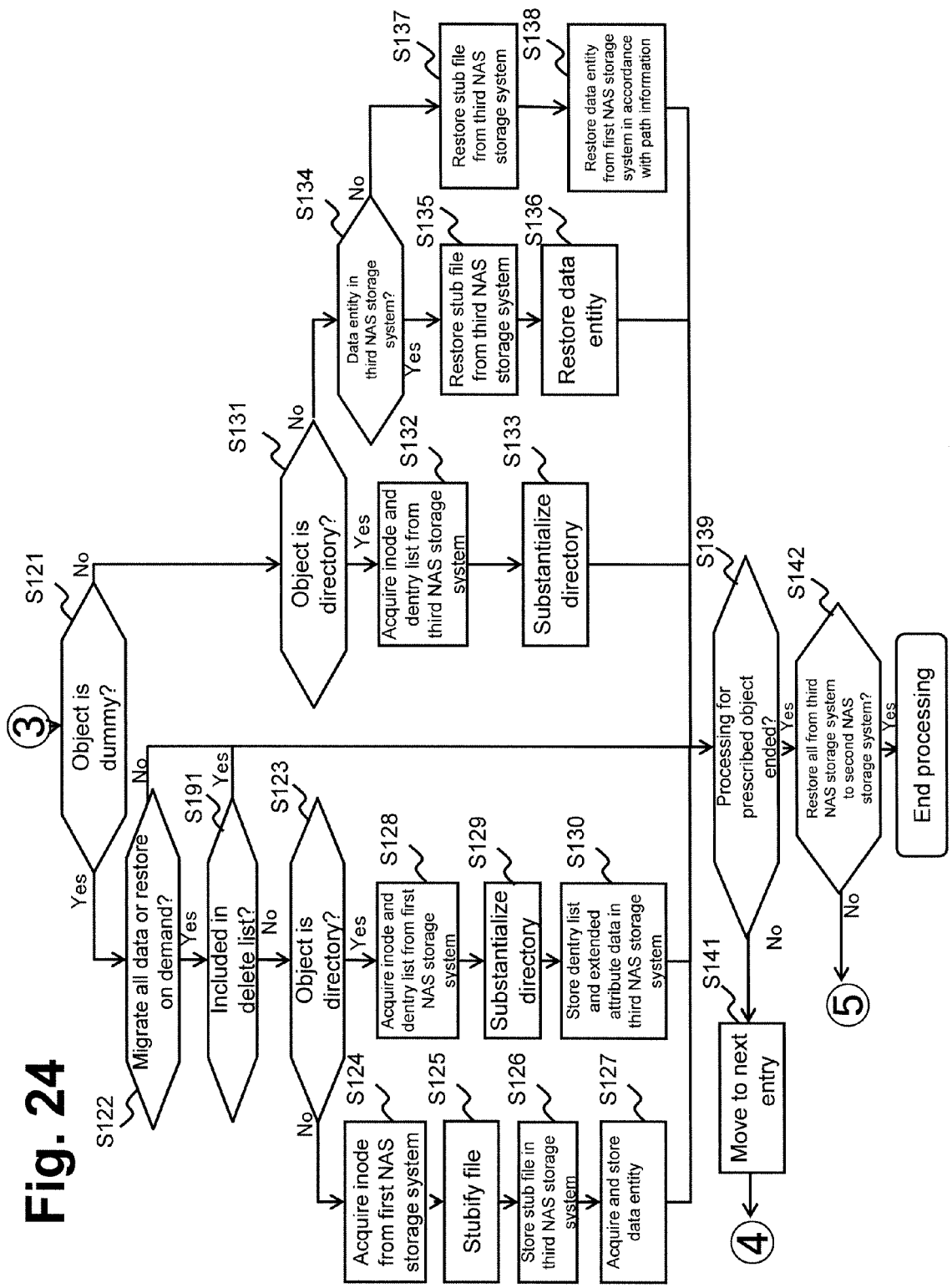
FIG. 24 is a flowchart of a restore process related to the variation of the present invention.

FIG. 24 is a flowchart of a restore process related to the variation of the present invention.

The restore process related to the variation replaces the processing of the flowchart shown in FIG. 21 related to the first embodiment with the flowchart shown in FIG. 24. The portion that differs from the processing shown in FIG. 21 will be explained here.

In Step S122, in either a case where a migration from the first NAS storage apparatus 100 to the second NAS storage apparatus 200 was an all-objects migration, or a case of an on-demand restore (Step S122: Yes), the CPU 213 acquires the deletion list from the third NAS storage apparatus 300, and determines whether or not the corresponding object routing path in the first NAS storage apparatus 100 is included on the deletion list (Step S191).

In a case where the result is that the corresponding object routing path in the first NAS storage apparatus 100 is not included on the deletion list (Step S191: No), the CPU 213 advances the processing to Step S123. Alternatively, a case in which the corresponding object routing path in the first NAS storage apparatus 100 is included on the deletion list (Step S191: Yes) signifies that the corresponding object has been deleted from the second NAS storage apparatus 200 and a restore is not needed, and the CPU 213 advances the processing to Step S139 without stubifying or substantializing the object. This enables the restore process to be made more efficient by making it possible to prevent the execution of stubification and substantialization processing for an object, which has been deleted from the second NAS storage apparatus 200.

The embodiment of the present invention has been explained hereinabove, but the present invention is not limited to this embodiment, and it goes without saying that various changes are possible without departing from the gist thereof.

REFERENCE SIGNS LIST

100 First NAS storage apparatus
200 Second NAS storage apparatus
300 Third NAS storage apparatus

The invention claimed is:

1. A storage system, which comprises a second NAS (Network Attached Storage) storage apparatus and a third NAS storage apparatus for migrating an object managed by a first NAS storage apparatus,
wherein the second NAS storage apparatus has a processor and a storage medium capable of storing data, and
wherein the processor of the second NAS storage apparatus is configured to:
with respect to an object for which a migration from the first NAS storage apparatus has been started, create management information with respect to the object and custom information including path information of an object path of the first NAS storage apparatus, and store the management information and the custom information in the third NAS storage apparatus prior to migrating an object entity to the third NAS storage apparatus; and
after receiving the object entity from the first NAS storage apparatus and migrating the object entity to the third NAS storage apparatus, store path information of the object entity of the third NAS storage apparatus in the management information of the object, and reflect the management information in the third NAS storage apparatus,
wherein the custom information includes information whether the object entity is stored in the third NAS storage apparatus, and
wherein, in a case where the second storage apparatus recovers from the failure, the processor is configured to:
determine whether the third NAS storage apparatus stores the object entity according to the custom information; acquire object information of the object and the object entity from the first NAS storage apparatus, if the third NAS storage apparatus does not store the object entity; and
acquire the object information of the object and the object entity from the third NAS storage apparatus, if the third NAS storage apparatus stores the object entity.

2. A storage system according to claim 1 is configured store, in a case where the migration of an object in the first NAS storage apparatus has been started, the management information with respect to the object in the storage medium and the third NAS storage apparatus; and
reflect, in a case where the management information of the object has been updated, reflects the management information of the object in the third NAS storage apparatus.

3. A storage system according to claim 2, wherein the processor is configured to:

store, in a case where the migration of an object in the first NAS storage apparatus has been started, dummy-state management information with respect to the object in the storage medium; and
reflects the management information in the dummy state in the third NAS storage apparatus and store the custom information in the third NAS storage apparatus [S5 of FIG. 10].

4. A storage system according to claim 1, wherein the processor is configured to:
in a case where the object is a file, convert the management information of the object in the storage medium to a stub state by storing path information of the object of the first NAS storage apparatus in the management information after reflecting dummy-state management information in the third NAS storage apparatus, and
reflect the management information of the stub state in the third NAS storage apparatus.

5. A storage system according to claim 4, wherein the processor is configured to:
in a case where the object is a file, acquire the object entity from the first NAS storage apparatus and stores the object entity in the storage medium, and, register a pointer to the object entity in the management information after reflecting stub-state management information in the third NAS storage apparatus; and
reflect the management information and the object entity in the third NAS storage apparatus.

6. A storage system according to claim 3, wherein the processor is configured to:
in a case where the object is a directory, store path information to the object of the first NAS storage apparatus in the management information;
acquire the object entity from the first NAS storage apparatus and stores the object entity in the storage medium, and, register a pointer to the object entity in the management information after reflecting dummy-state management information in the third NAS storage apparatus, and thereafter; and
reflect the management information and the object entity in the third NAS storage apparatus.

7. A storage system according to claim 1, wherein the processor is configured to:
with respect to an object for which a migration from the first NAS storage apparatus has been started,
receive a name change for the object;
change the name of the object in the management information, which stores the name of the object for which the name change has been implemented;
reflect the management information in the third NAS storage apparatus while maintaining a state in which the first NAS storage apparatus path information of the object is stored; and
not reflect the name change to the custom information.

8. A storage system according to claim 1, wherein the processor is configured to:
subsequent to replacing the storage medium of the second NAS storage apparatus with a new storage medium, acquire management information with respect to a restore-candidate object from the third NAS storage apparatus; and in a case where third NAS storage apparatus includes an object entity, acquire the object entity from the third NAS storage apparatus based on the path information in the management information, and stores the object entity in the storage medium, and
in a case where the object entity is not included in the third management information but the first NAS storage apparatus acquire an object entity from the first NAS storage apparatus based on the path information in the custom information, and stores the object entity in the storage medium.

9. A storage system according to claim 8, wherein the processor is configured to:
- upon receiving an object delete request, identify the first NAS storage apparatus path information of the deletion-target object, and stores the path information in the third NAS storage apparatus;
- acquire the first NAS storage apparatus path information of the deletion-target object from the third NAS storage apparatus subsequent to replacing the storage medium of the second NAS storage apparatus with a new storage medium; and
- in a case where the first NAS storage apparatus path information of a restore-candidate object matches the first NAS storage apparatus path information of the deletion-target object, not execute processing for the object for acquiring an object entity from the first NAS storage apparatus and also not execute processing for storing the object entity in the storage medium.

10. A storage system according to claim 9, wherein the processor is configured to:
- create a deletion list, which comprises one or more pieces of the first NAS storage apparatus path information of the deletion-target object;
- store the deletion list in the third NAS storage apparatus;
- acquires the deletion list from the third NAS storage apparatus subsequent to replacing the storage medium of the second NAS storage apparatus a new storage medium; and
- use the path information in the deletion list to determine a match between the first NAS storage apparatus path information of the restore-candidate object and the first NAS storage apparatus path information of the deletion-target object.

11. An object management method in a storage system, which has a second NAS storage apparatus and a third NAS storage apparatus for migrating an object managed by a first NAS storage apparatus,
in the second NAS storage apparatus, the object management method comprising:
- creating, with respect to an object for which a migration from the first NAS storage apparatus has been started, management information with respect to the object and custom information including path information of the object of the first NAS storage apparatus;
- storing the management information and the custom information in the third NAS storage apparatus prior to migrating an object entity to the third NAS storage apparatus; and
- storing path information of the object entity of the third NAS storage apparatus in the management information of the object and reflecting the management information in the third NAS storage apparatus after receiving the object entity from the first NAS storage apparatus and migrating the object entity to the third NAS storage apparatus; and
- wherein the custom information includes information whether the object entity is stored in the third NAS storage apparatus, and
- wherein, in a case where the second storage apparatus recovers from the failure, the processor is configured to:
  - determine whether the third NAS storage apparatus stores the object entity according to the custom information; acquire object information of the object and the object entity from the first NAS storage apparatus, if the third NAS storage apparatus does not store the object entity; and
  - acquire the object information of the object and the object entity from the third NAS storage apparatus, if the third NAS storage apparatus stores the object entity.

* * * * *